(12) United States Patent  
Horita et al.

(10) Patent No.: US 8,690,673 B2  
(45) Date of Patent: Apr. 8, 2014

(54) GAME APPARATUS, STORAGE MEDIUM, GAME CONTROLLING METHOD AND GAME SYSTEM

(75) Inventors: Jumpei Horita, Kyoto (JP); Ryusuke Niitani, Kyoto (JP); Takehiko Hosokawa, Kyoto (JP); Toyokazu Nonaka, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 228 days.

(21) Appl. No.: 13/304,826

(22) Filed: Nov. 28, 2011

(65) Prior Publication Data

US 2012/0309533 A1  Dec. 6, 2012

(30) Foreign Application Priority Data

Jun. 1, 2011 (JP) .................................. 2011-123036

(51) Int. Cl.  
*A63F 13/10* (2006.01)

(52) U.S. Cl.  
USPC ......... 463/36; 463/43; 463/7; 345/8; 345/659

(58) Field of Classification Search  
None  
See application file for complete search history.

(56) References Cited

U.S. PATENT DOCUMENTS

| 6,445,364 | B2* | 9/2002 | Zwern ................................ 345/8 |
| 7,598,856 | B1* | 10/2009 | Nick et al. ............... 340/539.13 |
| 2003/0231189 | A1* | 12/2003 | Williams ..................... 345/659 |
| 2010/0099475 | A1* | 4/2010 | Soichi ............................. 463/7 |
| 2010/0248844 | A1* | 9/2010 | Nakajima et al. ............... 463/43 |
| 2010/0323783 | A1* | 12/2010 | Nonaka et al. .................. 463/23 |
| 2011/0314910 | A1* | 12/2011 | Chen et al. ................. 73/504.12 |
| 2012/0007713 | A1* | 1/2012 | Nasiri et al. ................ 340/5.81 |

FOREIGN PATENT DOCUMENTS

JP  2010-227366  10/2010

* cited by examiner

*Primary Examiner* — Paul A D'Agostino  
(74) *Attorney, Agent, or Firm* — Nixon & Vanderhye P.C.

(57) ABSTRACT

An example of a game apparatus includes a CPU, and the CPU displays a title screen on a monitor when starting a virtual game. When a predetermined operation is performed here, a main part is started, and a first game selected on a top menu is started. Here, prior to a start of the first game, a stable state of a controller with a gyro unit is confirmed. The processing for confirmation is also executed in a case that the title screen is being displayed as well. After the confirmation, when a state that the controller is left continues for a predetermined time or more, a second game different from the first game is started.

16 Claims, 17 Drawing Sheets

(A)

(B)

(C)

(A) STABILITY CONFIRMATION SCREEN 200
(START OF CONFIRMATION, UNDER CONFIRMATION)

(B) STABILITY CONFIRMATION SCREEN 200
(END OF CONFIRMATION)

GAME APPARATUS, STORAGE MEDIUM, GAME CONTROLLING METHOD AND GAME SYSTEM

CROSS REFERENCE OF RELATED APPLICATION

The disclosure of Japanese Patent Application No. 2011-123036 filed on Jun. 1, 2011 is incorporated herein by reference.

FIELD

The present embodiment relates to a game apparatus, a storage medium, a game controlling method, and a game system. More specifically, the present embodiment relates to a game apparatus, a storage medium, a game controlling method and a game system using an operating device equipped with a gyro sensor.

SUMMARY

It is a primary object of this embodiment to provide a novel game apparatus, storage medium, game controlling method, and game system.

Furthermore, another object of this embodiment is to provide a game apparatus, storage medium, game controlling method and game system which gives a fun to a player if he or she has to wait before a start of a game, and he or she waits so long.

A first embodiment is a game apparatus performing game processing based on at least an angular velocity in response to an operation performed on an operating device equipped with a gyro sensor, and comprises an initial screen presenter, a determiner, a first game starter, a first game processor, a second game starter, and a second game processor. The initial screen presenter presents an initial screen before a start of a first game. The determiner determines whether or not an attitude of the operating device is stable when the initial screen is presented. For example, whether or not a state the operating device is at a standstill by being put on the desk, and so on continues is determined. The first game starter starts the first game in response to a predetermined operation when the initial screen is presented. The first game processor performs the first game on the basis of the angular velocity acquired from the operating device. The second game starter starts a second game different from the first game when a predetermined time has elapsed without performance of the predetermined operation after the determiner determines that the attitude of the operating device is stable. For example, when the initial screen is displayed, if a predetermined condition is satisfied, the second game is started. The second game processor performs the second game on the basis of the angular velocity acquired from the operating device.

According to the first embodiment, for example, when the initial screen is displayed, it is determined that the attitude of the operating device is stable. Thereafter, when a predetermined time has elapsed without performance of the predetermined operation, the second game can be played. This makes it possible to give a meaning to waiting for stability of the attitude of the operating device. Also, even if the player waits so long, he or she can play the second game and thus can have a fun. In addition, while the player waits in order to play the second game, it is determined that the attitude of the operating device is stable, and therefore, it is possible to naturally wait.

A second embodiment is according to the first embodiment, wherein the operating device has at least one key, and the first game starter starts the first game in response to an operation of the key. That is, when the key is operated, the first game is started, and when it is determined that the attitude of the operating device is stable, and the predetermined time has elapsed without any key operation, the second game is started.

According to the second embodiment, depending on the presence or absence of the key operation, it is possible to selectively play the first game and the second game.

A third embodiment is according to the first embodiment, wherein the second game processor ends the second game after a lapse of a predetermined time from the start of the second game, and the initial screen presenter further presents the initial screen after the end of the second game.

According to the third embodiment, the second game ends after a lapse of the predetermined time, and a return to the initial screen is made, and therefore, it is possible to give an element of play to the initial screen.

A fourth embodiment is according to the first embodiment, and the game apparatus further comprises an instruction presenter. The instruction presenter presents an instruction for making the attitude of the operating device stable if the determiner determines that the attitude of the operating device is not stable when the first game is started by the first game starter. In response thereto, the player puts the operating device on a desk and so on to thereby make its attitude stable. The first game starter starts the first game after the determiner determines that the attitude of the operating device is stable. That is, in a case that the attitude of the operating device is not stable, prior to a start of the first game, an instruction for making the attitude of the operating device stable is presented, and a determination as to whether the attitude of the operating device becomes stable is needed. In response thereto, if the player waits with the operating device put on a desk and so on in order to play the second game, the state that the attitude of the operating device is stable has already been determined, and therefore, if the first game is played thereafter, the determination processing is not needed.

According to the fourth embodiment, if in order to play the second game, the operating device is put on the desk and so on to make its attitude stable, when the first game is played thereafter, the determination processing is not needed, and therefore, it is possible to immediately play the first game.

A fifth embodiment is a storage medium storing a game program for performing game processing based on at least an angular velocity in response to an operation performed on an operating device equipped with a gyro sensor, the game program causes a computer to function as: an initial screen presenter which presents an initial screen before a start of a first game; a determiner which determines whether or not an attitude of the operating device is stable when the initial screen is presented; a first game starter which starts the first game in response to a predetermined operation when the initial screen is presented; a first game processor which performs the first game on the basis of the angular velocity acquired from the operating device; a second game starter which starts a second game different from the first game when a predetermined time has elapsed without performance of the predetermined operation after the determiner determines that the attitude of the operating device is stable; and a second game processor which performs the second game on the basis of the angular velocity acquired from the operating device.

In the fifth embodiment as well, similar to the first embodiment, it is possible to give a meaning to waiting. Also, if the player waits so long, he or she can have a fun. Moreover, the player can naturally wait.

A sixth embodiment is according to the fifth embodiment, wherein the operating device has at least one key, and the first game starter starts the first game in response to an operation of the key.

In the sixth embodiment as well, similar to the second embodiment, depending on the presence or absence of the key operation, it is possible to selectively play the first game and the second game.

A seventh embodiment is according to the fifth embodiment, wherein the second game processor ends the second game after a lapse of a predetermined time from the start of the second game, and the initial screen presenter further presents the initial screen after the end of the second game.

In the seventh embodiment as well, similar to the third embodiment, it is possible to give an element of play to the initial screen.

An eighth embodiment is according to the fifth embodiment, and the game program causes the computer to further function as an instruction presenter which presents an instruction for making the attitude of the operating device stable if the determiner determines that the attitude of the operating device is not stable when the first game is started by the first game starter, wherein the first game starter starts the first game after the determiner determines that the attitude of the operating device is stable.

In the eighth embodiment as well, similar to the fourth embodiment, it is possible to play the first game immediately.

A ninth embodiment is a game controlling method of a game apparatus performing game processing based on at least an angular velocity in response to an operation performed on an operating device equipped with a gyro sensor, comprising: (a) presenting an initial screen before a start of a first game; (b) determining whether or not an attitude of the operating device is stable when the initial screen is presented; (c) starting the first game in response to a predetermined operation when the initial screen is presented; (d) performing the first game on the basis of the angular velocity acquired from the operating device; (e) starting a second game different from the first game when a predetermined time has elapsed without performance of the predetermined operation after the step (b) determines that the attitude of the operating device is stable; and (f) performing the second game on the basis of the angular velocity acquired from the operating device.

In the ninth embodiment as well, similar to the first embodiment, it is possible to give a meaning to waiting. Also, if the player waits so long, he or she can have a fun. Moreover, the player can naturally wait.

A tenth embodiment is according to the ninth embodiment, wherein the operating device includes at least one key, and the step (c) starts the first game in response to an operation of the key.

In the tenth embodiment as well, similar to the second embodiment, depending on the presence and absence of the key operation, it is possible to selectively play the first game and the second game.

An eleventh embodiment is according to the ninth embodiment, comprising: the step (e) ends the second game after a lapse of a predetermined time from the start of the second game, and the step (a) further presents the initial screen after the end of the second game.

In the eleventh embodiment as well, similar to the third embodiment, it is possible to give an element of play to the initial screen.

A twelfth embodiment is according to the ninth embodiment, further comprising: (g) presenting an instruction for making the attitude of the operating device stable if the step (b) determines that the attitude of the operating device is not stable when the first game is started by the step (c), wherein the step (c) starts the first game after the step (b) determines that the attitude of the operating device is stable.

In the twelfth embodiment as well, similar to the fourth embodiment, it is possible to immediately play the first game.

A thirteenth embodiment is a game system for performing game processing based on at least an angular velocity in response to an operation performed on an operating device equipped with a gyro sensor, comprising: an initial screen presenter which presents an initial screen before a start of a first game; a determiner which determines whether or not an attitude of the operating device is stable when the initial screen is presented; a first game starter which starts the first game in response to a predetermined operation when the initial screen is presented; a first game processor which performs the first game on the basis of the angular velocity acquired from the operating device; a second game starter which starts a second game different from the first game when a predetermined time has elapsed without performance of the predetermined operation after the determiner determines that the attitude of the operating device is stable; and a second game processor which performs the second game on the basis of the angular velocity acquired from the operating device.

In the thirteenth embodiment as well, it is possible to give a meaning to waiting. Also, if the player waits so long, he or she can have a fun. Moreover, the player can naturally wait.

A fourteenth embodiment is according to the thirteenth embodiment, wherein the operating device has at least one key, and the first game starter starts the first game in response to an operation of the key.

In the fourteenth embodiment as well, similar to the second embodiment, depending on the presence or absence of the key operation, it is possible to selectively play the first game and the second game.

A fifteenth embodiment is according to the thirteenth embodiment, wherein the second game processor ends the second game after a lapse of a predetermined time from the start of the second game, and the initial screen presenter further presents the initial screen after the end of the second game.

In the fifteenth embodiment as well, similar to the third embodiment, it is possible to give an element of play to the initial screen.

A sixteenth embodiment is according to the thirteenth embodiment, further comprising an instruction presenter which presents an instruction for making the attitude of the operating device stable if the determiner determines that the attitude of the operating device is not stable when the first game is started by the first game starter, wherein the first game starter starts the first game after the determiner determines that the attitude of the operating device is stable.

In the sixteenth embodiment as well, similar to the fourth embodiment, it is possible to immediately play the first game.

The above described objects and other objects, features, aspects and advantages of the present embodiment will become more apparent from the following detailed description of the present embodiment when taken in conjunction with the accompanying drawings.

DETAILED DESCRIPTION OF NON-LIMITING EXAMPLE EMBODIMENTS

Figure 1:
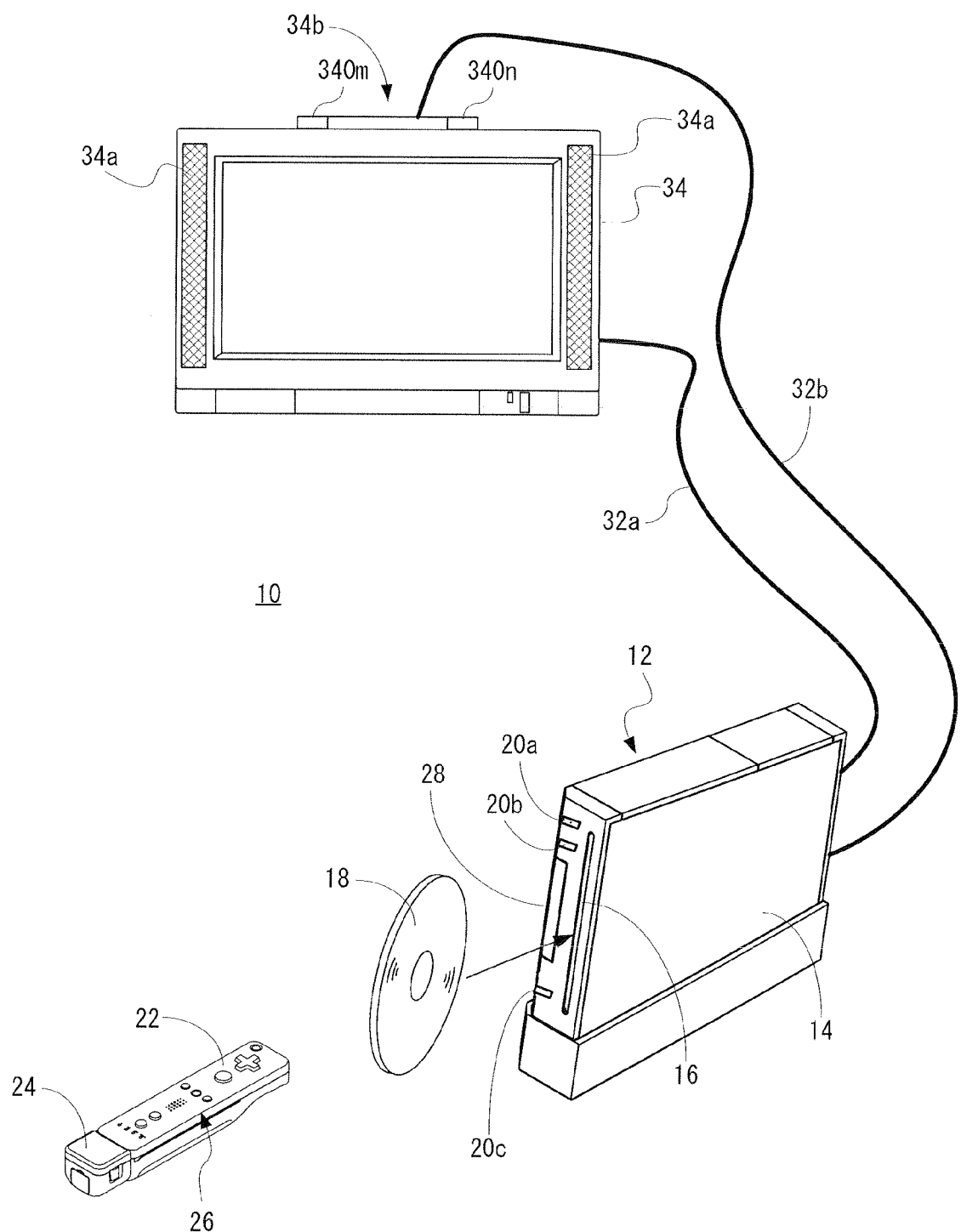
FIG. 1 shows an example non-limiting game system.

Referring to FIG. 1, a game system 10 of the non-limiting example embodiment includes a video game apparatus (hereinafter, simply referred to as "game apparatus") 12 and a controller 22. Although illustration is omitted, the game apparatus 12 of this embodiment is designed such that it can be connected with up to four controllers 22. Furthermore, the game apparatus 12 and the respective controllers 22 are wirelessly connected. The wireless communication is executed according to a Bluetooth (registered trademark) standard, for example, but may be executed by other standards such as infrared rays, a wireless LAN. In addition, it may be connected by a wire. Furthermore, in this embodiment, the controller 22 is connected (coupled) with a gyro unit 24.

The game apparatus 12 includes a roughly rectangular parallelepiped housing 14, and the housing 14 is furnished with a disk slot 16 on a front surface. Through the disk slot 16, an optical disk 18 as one example of an information storage medium storing game program, etc. is inserted to be loaded into a disk drive 54 (see FIG. 2) within the housing 14. Although illustration is omitted, around the disk slot 16, an LED and a light guide plate are arranged such that the LED of the disk slot 16 can light up or blink in accordance with various processing.

Furthermore, on the upper front surface of the housing 14 of the game apparatus 12, a power button 20a and a reset button 20b are provided, and below them, an eject button 20c is provided. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing game data described above may be performed on an internal memory, such as a flash memory 44 (see FIG. 2) provided inside the game apparatus 12 in place of the memory card. Also, the memory card may be utilized as a backup memory for the internal memory. In addition, in the game apparatus 12, other applications except for the game may be executed, and in such a case, data of the other applications can be stored in the memory card.

Here, a general-purpose SD card can be employed as a memory card, but other general-purpose memory cards, such as memory sticks, a multimedia card (registered trademark) can be employed.

Although omitted in FIG. 1, the game apparatus 12 has an AV cable connector 58 (FIG. 2) on a rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights ahead of the monitor 34.

Furthermore, the power of the game apparatus 12 is applied by means of a general AC adapter (not illustrated). The AC adapter is inserted into a standard wall socket for home use, and the game apparatus 12 transforms house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the player selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any of an inputter 26, a game or other application is started. Besides the operation of the inputter 26, by moving the controller 22 itself, it is possible to move a moving image object (player object) in different directions or change a perspective of the player (camera position) in a 3-dimensional game world.

Here, programs of the video game and other applications may be stored (installed) in an internal memory (flash memory 42 (see FIG. 2)) of the game apparatus 12 so as to be executed from the internal memory. In such a case, programs stored in a storage medium like an optical disk 18 may be installed onto the internal memory, or downloaded programs may be installed onto the internal memory.

Figure 2:
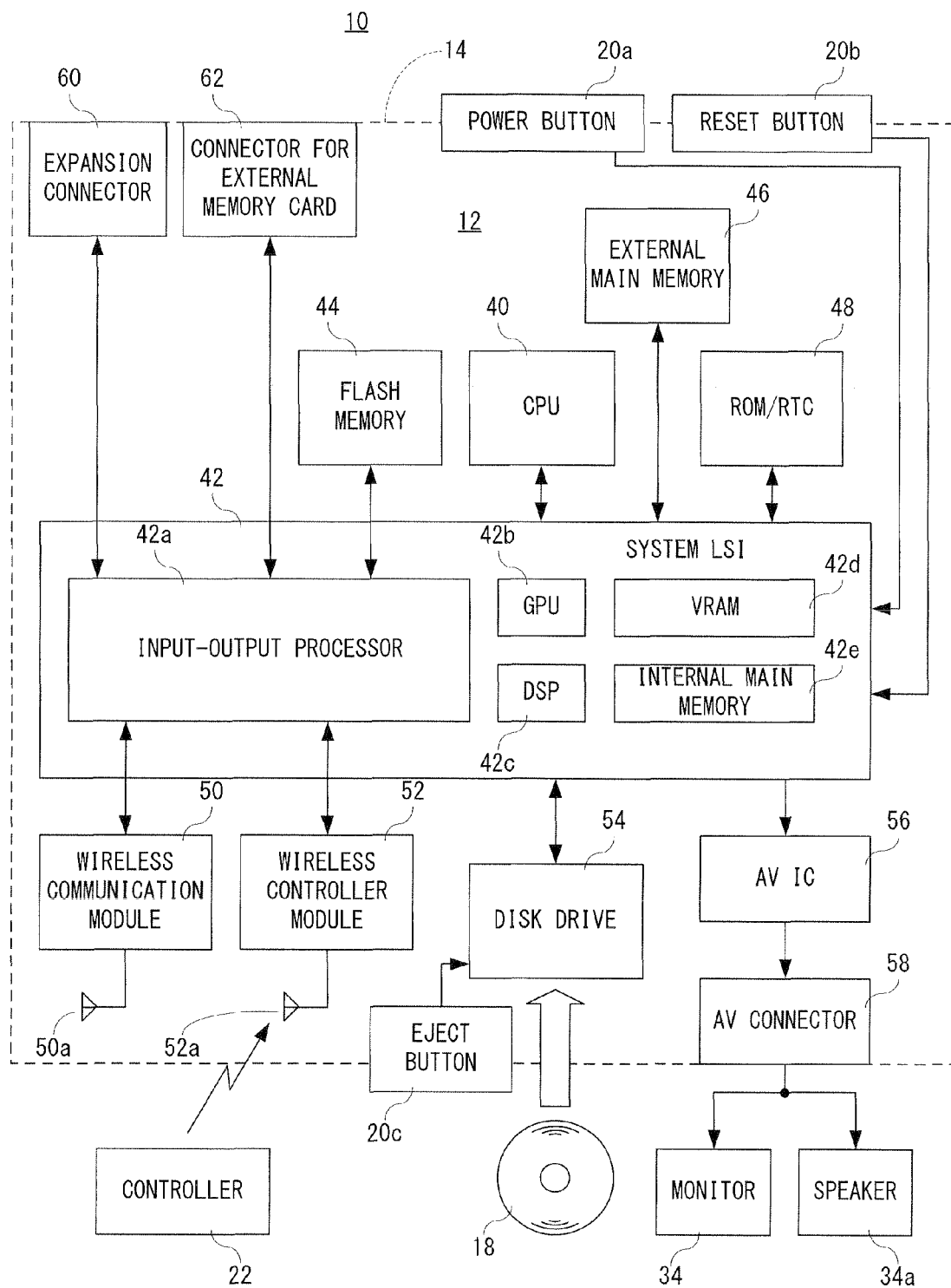
FIG. 2 shows an example non-limiting electric configuration of a game system shown in FIG. 1.

FIG. 2 is a block diagram showing an electric configuration of the video game system 10 in FIG. 1 embodiment. Although illustration is omitted, respective components within the housing 14 are mounted on a printed board. As shown in FIG. 2, the game apparatus 12 has a CPU 40 which functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area or a buffer area of the CPU 40 for storing programs like a game program, etc., and various data. The ROM/RTC 48, called boot ROM, is incorporated with a program for activating the game apparatus 12, and provided with a time circuit for counting a time. The disk drive 54 reads a program, image data, sound data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e. These are connected with each other by internal buses although illustration is omitted. The input-output processor (I/O processor) 42a executes transmission and reception of data, downloads of data, and so forth. A description as to transmission and reception and download of the data follows later.

The GPU 42b is made up of a part of a depicter, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for depiction to the VRAM 42d via the GPU 42b. The GPU 42b accesses the VRAM 42d to create game image data for depiction.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data which are stored in the internal main memory 42e and the external main memory 46.

The game image data and audio data which are generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50, a wireless controller module 52, an expansion connector 60 and a connector for external memory card 62. The wireless communication module 50 is connected with an antenna 50a, and the wireless controller module 52 is connected with an antenna 52a.

Although illustration is omitted, the input-output processor 42a can communicate with other game apparatuses and various servers that are connected to a network via the wireless communication module 50. It should be noted that it is possible to directly communicate with other game apparatuses without going through the network. The input-output processor 42a periodically accesses the flash memory 44 to detect the presence or absence of data (referred to as transmission data) required to be transmitted to a network, and transmits it to the network via the wireless communication module 50 and the antenna 50a in a case that the transmission data is present. Furthermore, the input-output processor 42a receives data (referred to as reception data) transmitted from other game apparatuses via the network, the antenna 50a and the wireless communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives controller data transmitted from the controller 22 via the antenna 52a and the wireless controller module 52, and (temporarily) stores it in the buffer area of the internal main memory 42e or the external main memory 46. The controller data is erased from the buffer area after being utilized in the processing by the CPU 40 (game processing, for example).

In this embodiment, the wireless controller module 52 performs a communication with the controller 22 in accordance with Bluetooth standards as described above.

In addition, the input-output processor 42a is connected with the expansion connector 60 and the connector for external memory card 62. The expansion connector 60 is a connector for interfaces, such as USB, SCSI, etc., and can be connected with medium such as an external storage, and peripheral devices such as other controllers different from the controller 22. Furthermore, the expansion connector 60 is connected with a cable LAN adaptor, and the cable LAN can be used in place of the wireless communication module 50. The connector for external memory card 62 can be connected with an external storage like a memory card. Thus, for example, the input-output processor 42a accesses the external storage via the expansion connector 60 and the connector for external memory card 62 to store and read the data therefrom.

Although a detailed description is omitted, the game apparatus 12 (housing 14) is furnished with the power button 20a, the reset button 20b, and the eject button 20c as shown in FIG. 1. The power button 20a is connected to the system LSI 42. When the power button 20a is turned on, the system LSI 42 is set to a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 48, the wireless communication module 50, and the wireless controller module 52. Accordingly, in this embodiment, in the standby mode, the CPU 40 never performs the application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52a is not performed in the standby mode.

The reset button 20b is also connected to the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

FIG. 3(A) to FIG. 3(E) show one example of an external appearance of the controller 22. FIG. 3(A) shows a leading end surface of the controller 22, FIG. 3(B) shows a top surface of the controller 22, FIG. 3(C) shows a right surface of the controller 22, FIG. 3(D) shows a bottom surface of the controller 22, and FIG. 3(E) shows a trailing end surface of the controller 22.

Referring to FIG. 3(A) to FIG. 3(E), the controller 22 has a housing 22a formed by plastic molding, for example. The housing 22a is formed into an approximately rectangular parallelepiped shape and has a size small enough to be held by one hand of a player. The housing 22a (controller 22) is provided with the inputter (a plurality of buttons or switches) 26. Specifically, as shown in FIG. 3(B), on a top surface of the housing 22a, there are provided a cross key 26a, a 1 button 26b, a 2 button 26c, an A button 26d, a – (minus) button 26e, a HOME button 26f, a + (plus) button 26g and a power switch 26h. Moreover, as shown in FIG. 3(C) and FIG. 3(D), an inclined surface is formed on a bottom surface of the housing 22a, and a B-trigger switch 26i is formed on the inclined surface.

The cross key 26a is a four directional push switch, including four directions of front (or upward), back (or downward), right and left operation parts. By operating any one of the operation parts, it is possible to instruct a moving direction of a character or an object (player character or player object) that is operable by a player, instruct the moving direction of a cursor, or merely instruct the direction thereof.

The 1 button 26b and the 2 button 26c are respectively push button switches. They are used for a game operation, such as adjusting a viewpoint position and a viewpoint direction in displaying the 3D game image, i.e. a position and an angle of view of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to give an instruction to acquire an item, select and determine the weapon and command, and so forth. Furthermore, in a case that the controller 22 is used as a pointing device, the A-button switch 26d is used to instruct a decision of an icon or a button image designated by a pointer (designating image) on the game screen. For example, when the icon or the button image is decided, an instruction or a command set in advance corresponding thereto can be input.

The – button 26e, the HOME button 26f, the + button 26g, and the power supply switch 26h are also push button switches. The – button 26e is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the inputter 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting, and designating a position selected by the controller 22. In a case that the B-trigger switch 26i is pushed and held, it is possible to make movements and parameters of the player object constant. In a fixed case, the B-trigger switch 26i functions in the same way as the normal B-button, and is used for canceling the action and the command determined by the A-button 26d and so on.

As shown in FIG. 3(E), an externally extensive connector 22b is provided on a trailing end surface of the housing 22a, and as shown in FIG. 3(B), an indicator 22c is provided on the top surface and on the side of the trailing end surface of the housing 22a. The externally extensive connector 22b is used for connecting an extensive controller different from the controller 22 (not shown). The indicator 22c is made up of four LEDs, for example. The indicator 22c can show identification information (controller number) of the controller 22 by lighting any one of the four LEDs and according to the lighted LED, and show the remaining amount of the battery of the controller 22 depending on the number of LEDs to be emitted.

In addition, the controller 22 has an imaged information arithmetic section 80 (see FIG. 5), and a light incident opening 22d of the imaged information arithmetic section 80 is provided on the leading end surface of the housing 22a as shown in FIG. 3(A). Furthermore, the controller 22 has a speaker 86 (see FIG. 5), and the speaker 86 is provided inside the housing 22a at the position corresponding to a sound release hole 22e between the 1 button 26b and the HOME button 26f on the top surface of the housing 22a as shown in FIG. 3(B).

Note that the shape of the controller 22 and the shape, number and setting position of each inputter 26 shown in FIG. 3(A) to FIG. 3(E) are simply one example, and needless to say, even if they are suitably modified, the present embodiment can be implemented.

FIG. 4(A) shows an illustrative view showing a state that the controller 22 is connected with the gyro unit 24 as shown in FIG. 1. The gyro unit 24 is connected to the trailing end surface of the controller 22 (on the side of the indicator 22c).

As shown in FIG. 4(B), the gyro unit 24 has a housing 24a formed by plastics molding similar to the controller 22. The housing 24a is a substantially cubic shape, and has an attachment plug 24b to be connected to the external extensive connector 22b of the controller 22 on the surface of the connecting side to the controller 22. Furthermore, as shown in FIG. 4(C), on the opposite side to the side where the attachment plug 24b is provided, an external extensive connector 24c is provided. Although detailed description is omitted, when the gyro unit 24 is connected to the controller 22, a rock mechanism maintains the connected state. The connected state is cancelled when a cancel buttons 24d provided both of the side surfaces of the gyro unit 24 are pushed. This makes it possible to detachably attach the gyro unit 24 to the controller 22.

Figure 5:
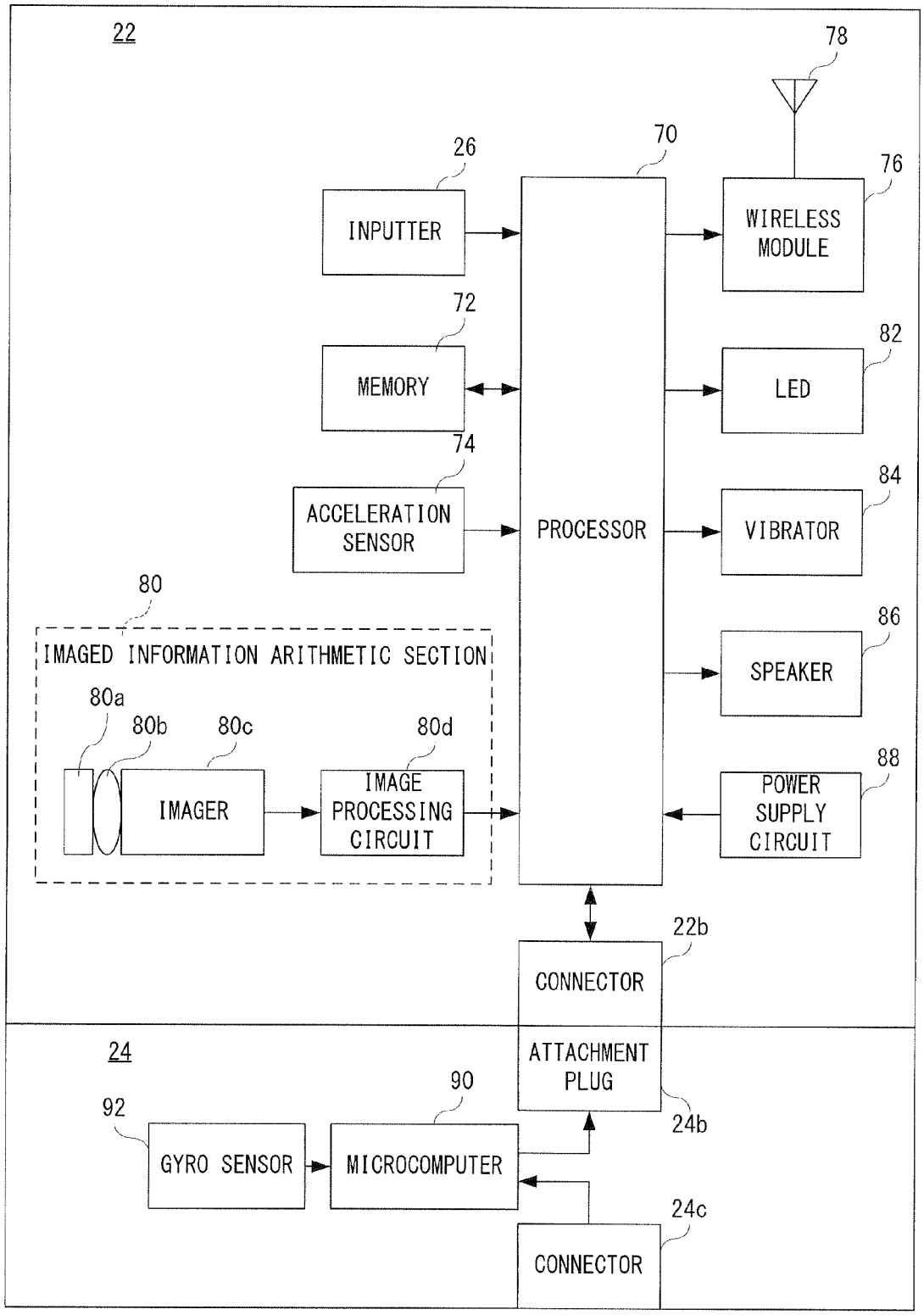
FIG. 5 shows an example non-limiting electric configuration of the controller connected with the gyro unit shown in FIG. 1.

FIG. 5 is a block diagram showing an electric configuration of the controller 22 and the gyro unit 24. Referring to FIG. 5, the controller 22 includes a processor 70, and the processor 70 is connected with the external extensive connector 22b, the inputter 26, a memory 72, an acceleration sensor 74, a wireless module 76, an imaged information arithmetic section 80, an LED 82 (indicator 22c), a vibrator 84, a speaker 86 and a power supply circuit 88 by an internal bus (not shown). Also, the wireless module 76 is connected with an antenna 78.

Although omitted in FIG. 5 for the sake of simplicity, the indicator 22c is made up of four LEDs 82 as described above.

The processor 70 first entirely controls the controller 22, and transmits (inputs) the information (input information) input by the inputter 26, the acceleration sensor 74 and the imaged information arithmetic section 80 as controller data to the game apparatus 12 via the wireless module 76 and the antenna 78. At this time, the processor 70 utilizes the memory 72 as a working area or a buffer area. Furthermore, the operation signal (operation data) from the above-described inputter 26 (26a-26i) is input to the processor 70, and the processor 70 temporarily stores the operation data in the memory 72.

Figure 4:
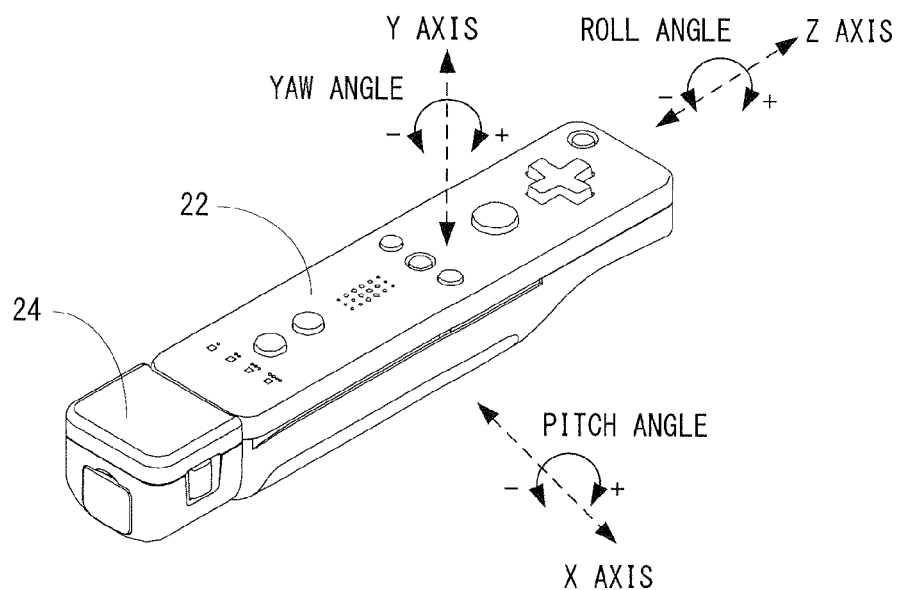
FIG. 4 shows an example non-limiting appearance of a controller connected with the gyro unit and a gyro unit that are shown in FIG. 1.
Figure 4:
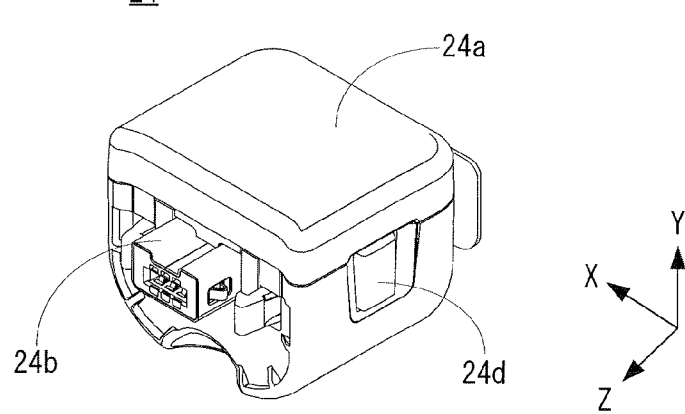
Figure 4:
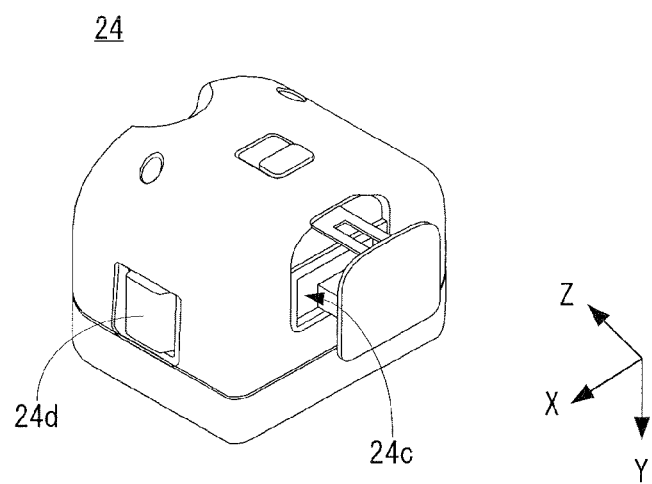

The acceleration sensor 74, as shown in FIG. 4, detects each acceleration of the controller 22 in directions of three axes of vertical direction (Y-axial direction), lateral direction (X-axial direction), and forward and rearward directions (Z-axial direction). The acceleration sensor 74 is typically an acceleration sensor of an electrostatic capacity type, but the acceleration sensor of other types may also be used.

For example, when the acceleration sensor 74 detects accelerations (ax, ay, and az) in each direction of X-axis, Y-axis, Z-axis, it inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. This holds true below.) The processor 70 detects the acceleration data given from the acceleration sensor 74, and temporarily stores it in the memory 72.

The processor 70 creates controller data including any one of operation data, acceleration data, marker coordinate data described later and angular velocity data described later, and transmits the created controller data to the game apparatus 12.

Figure 3:
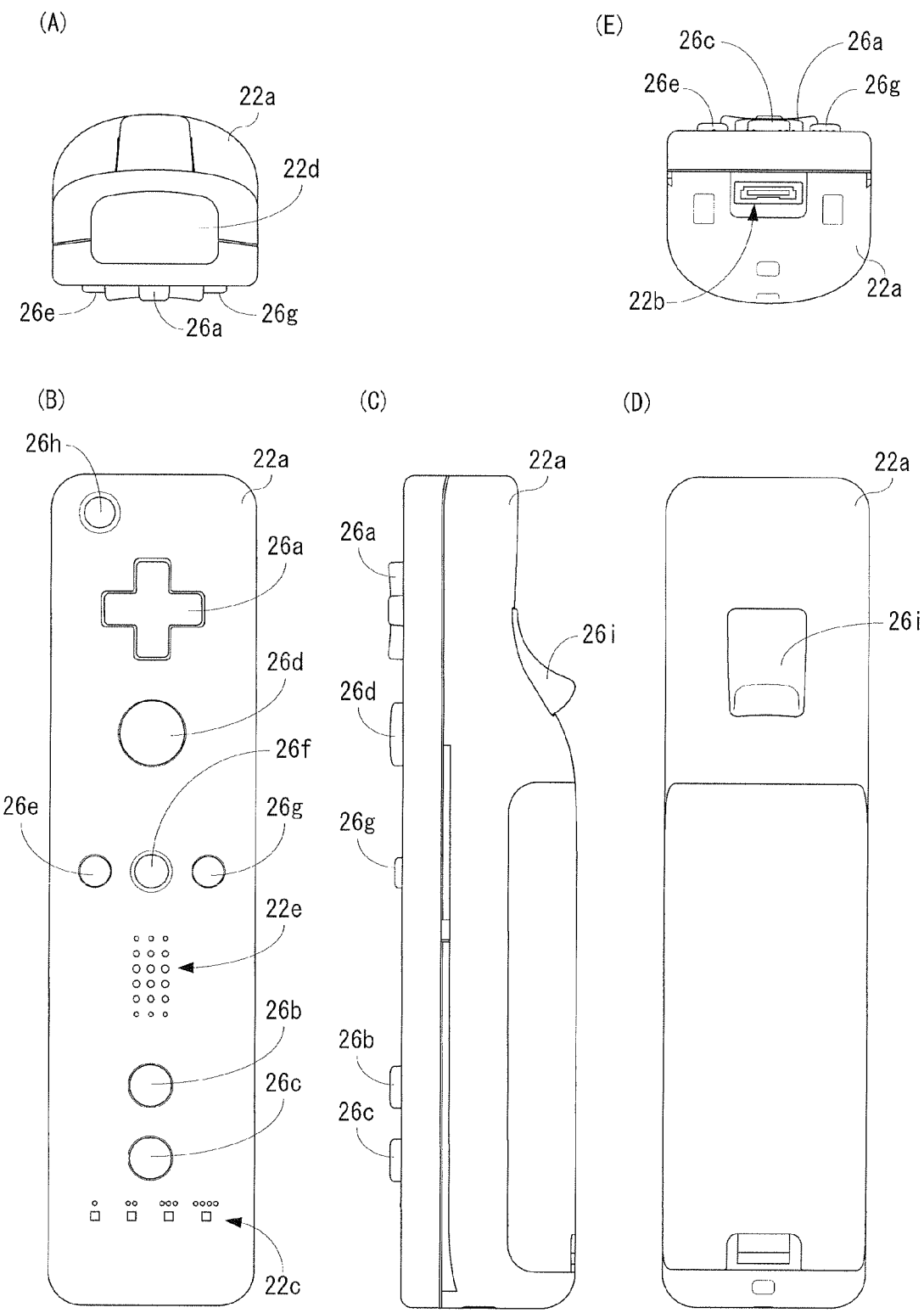
FIG. 3 shows an example non-limiting appearance of a controller shown in FIG. 1.

Although omitted in FIG. 3 (A) to FIG. 3 (E), the acceleration sensor 74 is provided inside the housing 22a on the circuit board in the vicinity of a place where the cross key 26a is arranged in this embodiment.

The wireless module 76 modulates a carrier of a predetermined frequency by the controller data by using a technique of Bluetooth, for example, and emits its weak radio wave signal from the antenna 78. Namely, the controller data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the controller data from the controller 22. Then, the CPU 40 performs the processing of the application (game processing), following the acquired controller data and the application program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights ahead of the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data (marker coordinate data described later). It should be noted that the processing in the image processing circuit 80d is described later.

Furthermore, the controller 22 is connected with the gyro unit 24. As understood from FIG. 5, the attachment plug 24b is connected to the external extensive connector 22b. The attachment plug 24b is connected with a microcomputer 90 with a signal line. The microcomputer 90 is connected with a gyro sensor 92, and connected with the external extensive connector 24c with a signal line.

The gyro sensor 92 detects angular velocities about three axes of vertical direction (about a Y-axial direction), lateral direction (about an X-axial direction), and forward and rearward directions (about a Z-axial direction) of the controller 22. Here, as shown in FIG. 4, a rotation about the Y axis is represented by a yaw angle, a rotation about the X axis is represented by a pitch angle, and a rotation about the Z axis is represented by a roll angle. The gyro sensor 92 can employ a typically piezoelectric vibration type, but may employ other types.

For example, the gyro sensor 92 detects an angular velocity ($\omega x$, $\omega y$, $\omega z$) in relation to each of the X axis, the Y axis, and the Z axis, and inputs the detected angular velocities to the microcomputer 90. Here, when the angular velocities are converted from analog signals to digital data when input to the microcomputer 90. The gyro sensor 92 used in this embodiment can measure an angular velocity relative to each axis in the range from 0 to 1500 dps (degree percent second). In the virtual game of this embodiment described later, the range from 900 to 1500 dps is a range of measure relative to the yaw angle, and the range from 0 to 1500 dps is a range of measure relative to the pitch angle and the roll angle.

The microcomputer 90 detects an angular velocity applied from the gyro sensor 92, and temporarily stores the detected angular velocity data corresponding to the angular velocity in a memory (not illustrated) included in the microcomputer 90. Then, the microcomputer 90 transmits the angular velocity data temporarily stored in the memory to the controller 22 (processor 70).

Noted that in this embodiment, the microcomputer 90 temporarily stores the angular velocity data in the memory, and transmits the same in batches to a certain degree to the processor 70, but may directly transmit the angular velocity data to the processor 70 without temporarily storing the same in the memory.

Figure 6:
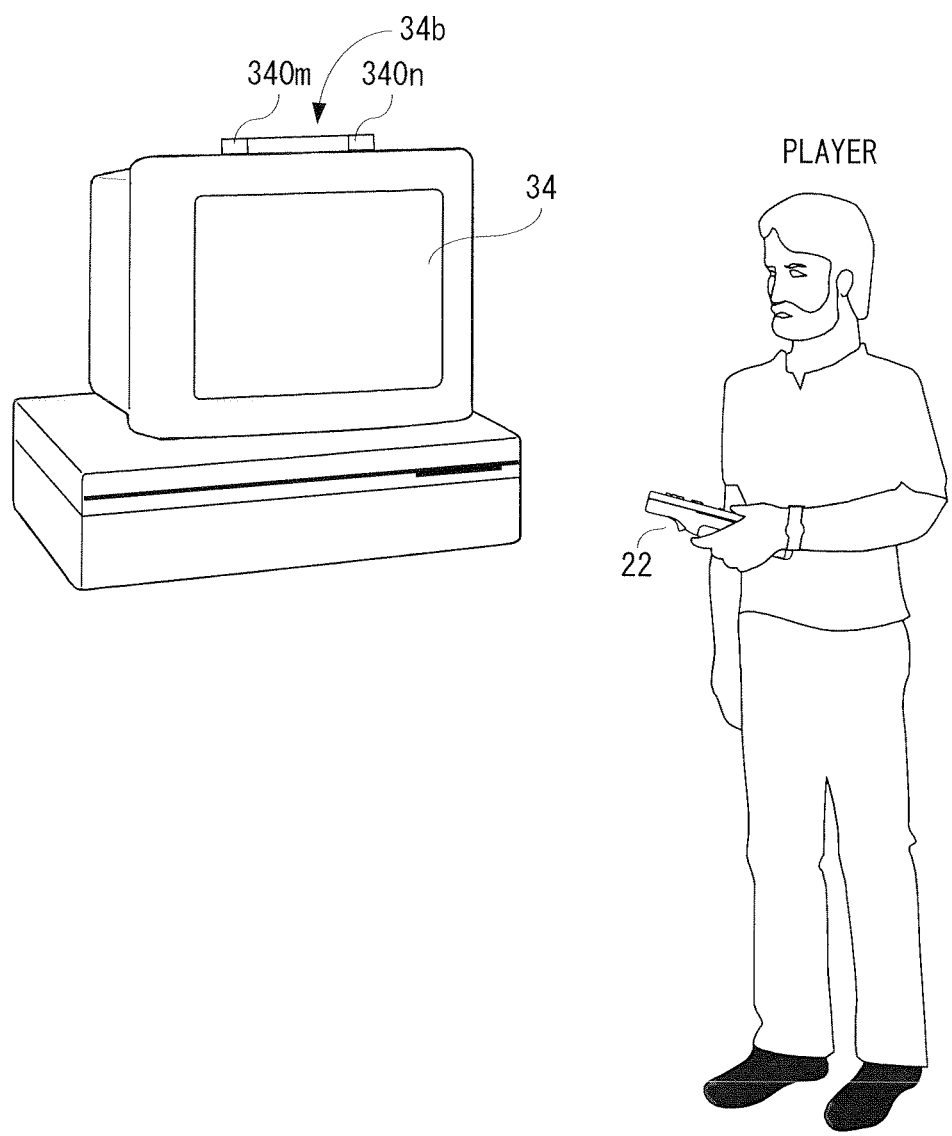
FIG. 6 shows an example non-limiting situation in which a game is played using the controller connected with the gyro unit shown in FIG. 1.

FIG. 6 is an illustrative view showing a situation in which a game is played using the controller 22. This holds true for a case that another application is executed or a case that a DVD is reproduced without being restricted to the game play. As shown in FIG. 6, when playing a game in the video game system 10 by utilizing the controller 22, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen designated by the controller 22, and changing a distance between the controller 22 and each of the markers 340m and 340n.

Here, it is difficult to view in FIG. 6, this holds true for a case that the above-described gyro unit 24 is connected to the controller 22.

Figure 7:
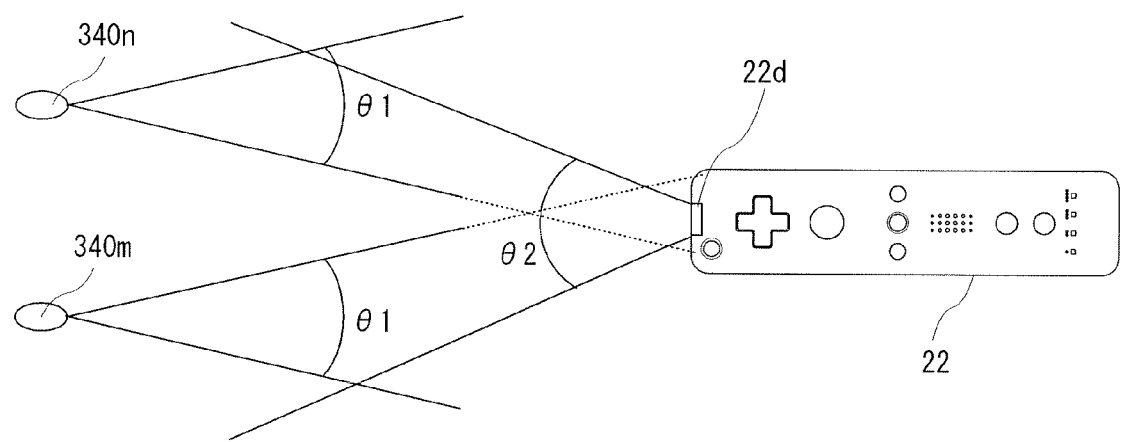
FIG. 7 shows an example non-limiting markers and viewing angles of the controller shown in FIG. 1.

FIG. 7 is a view showing viewing angles between the respective markers 340m and 340n, and the controller 22. As shown in FIG. 7, each of the markers 340m and 340n emits infrared ray within a range of a viewing angle θ1. Also, the imager 80c of the imaged information arithmetic section 80 can receive incident light within the range of the viewing angle θ2 with the line of sight of the controller 22 as center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80e, and the controller 22 exists in at least one of the viewing angles θ1 of the marker 340m or 340n. In this state, the controller 22 can detect at least one of the markers 340m and 340n. The player can perform a game operation by changing the position and the attitude of the controller 22 in the range satisfying the state.

If the position and the attitude of the controller 22 are out of the range, the game operation cannot be performed by using the controller 22 as a pointing device. Hereafter, the above-described range is called a "pointing operation allowable range".

Figure 8:
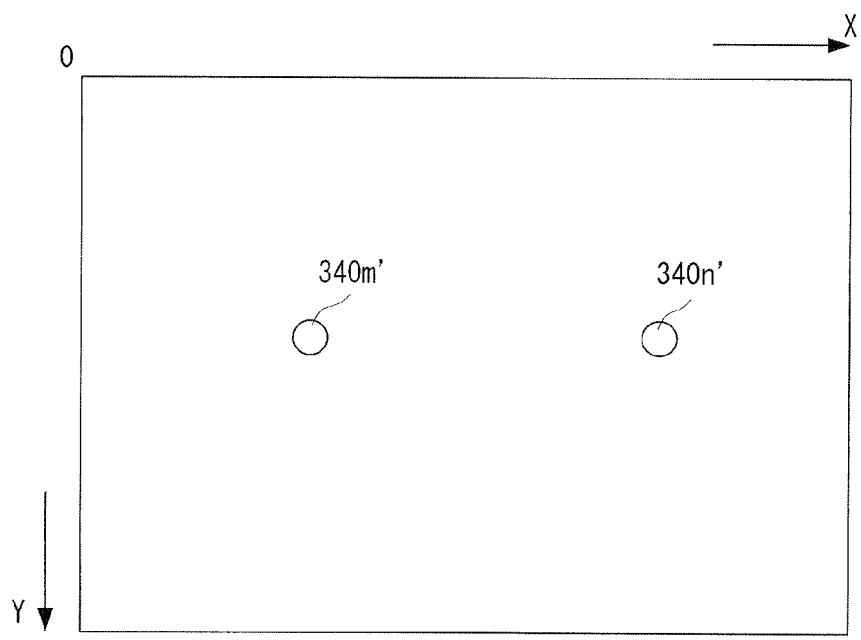
FIG. 8 shows an example non-limiting imaged images including object images.

If the controller 22 is held within the pointing operation allowable range, an image of each of the markers 340m and 340n is imaged by the imaged information arithmetic section 80. That is, the imaged image acquired by the imager 80c includes an image (object image) of each of the markers 340m and 340n as an object to be imaged. FIG. 8 is an illustrative view showing one example of the imaged image including the object images. The image processing circuit 80d calculates coordinates (marker coordinates) indicative of the position of each of the markers 340m and 340n in the imaged image by utilizing the image data of the imaged image including the object images.

Since the object image appears as a high-intensity part in the image data of the imaged image, the image processing circuit 80d first detects the high-intensity part as a candidate of the object image. Next, the image processing circuit 80d determines whether or not the high-intensity part is the object image on the basis of the size of the detected high-intensity part. The imaged image may include images other than the object image due to sunlight through a window and light of a fluorescent lamp in the room as well as the images 340m' and 340n' corresponding to the two markers 340m and 340n as an object image. The determination processing whether or not the high-intensity part is an object image is executed for discriminating the images 340m' and 340n' as an object image from the images other than them, and accurately detecting the object image. More specifically, in the determination processing, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, and the image processing circuit 80d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80c. Now, the resolution of the imaged image imaged by the imager 80c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination processing, and therefore, two marker coordinates are calculated. The image processing circuit 80d outputs data indicative of the calculated two marker coordinates. The data of the output marker coordinates (marker coordinate data) is included in the controller data by the processor 70 as described above, and transmitted to the game apparatus 12.

The game apparatus 12 (CPU 40) detects the marker coordinate data from the received controller data to thereby calculate an designated position (designated coordinate) by the controller 22 on the screen of the monitor 34 and a distances from the controller 22 to each of the markers 340m and 340n on the basis of the marker coordinate data. More specifically, from the position of the mid point of the two marker coordinates, a position to which the controller 22 faces, that is, a designated position is calculated. The distance between the object images in the imaged image is changed depending on the distance between the controller 22 and each of the markers 340m and 340n, and therefore, the game apparatus 12 can grasp the distance between the controller 22 and each of the markers 340m and 340n by calculating the distance between the two marker coordinates.

It should be noted that each output to the above-described processor 70 is executed every 1/200 sec., for example. Accordingly, the operation data from the inputter 26, the position coordinate data from the imaged information arithmetic section 80, the acceleration data from the acceleration sensor 74, and the angular velocity data from the gyro sensor 92 are once output to the processor 70 for arbitrary 1/200 sec. Furthermore, the controller data is transmitted to the game apparatus 12 every 1/200 sec., for example. The wireless controller module 52 receives the controller data transmitted from the controller 22 at predetermined cycles (1/200 sec. for example), and stores them in a buffer not shown included in the wireless controller module 52. Thereafter, the game apparatus 12 reads the controller data stored during the period by the input processor 42a every frame (screen updating rate: 1/60 sec.).

Figure 9:
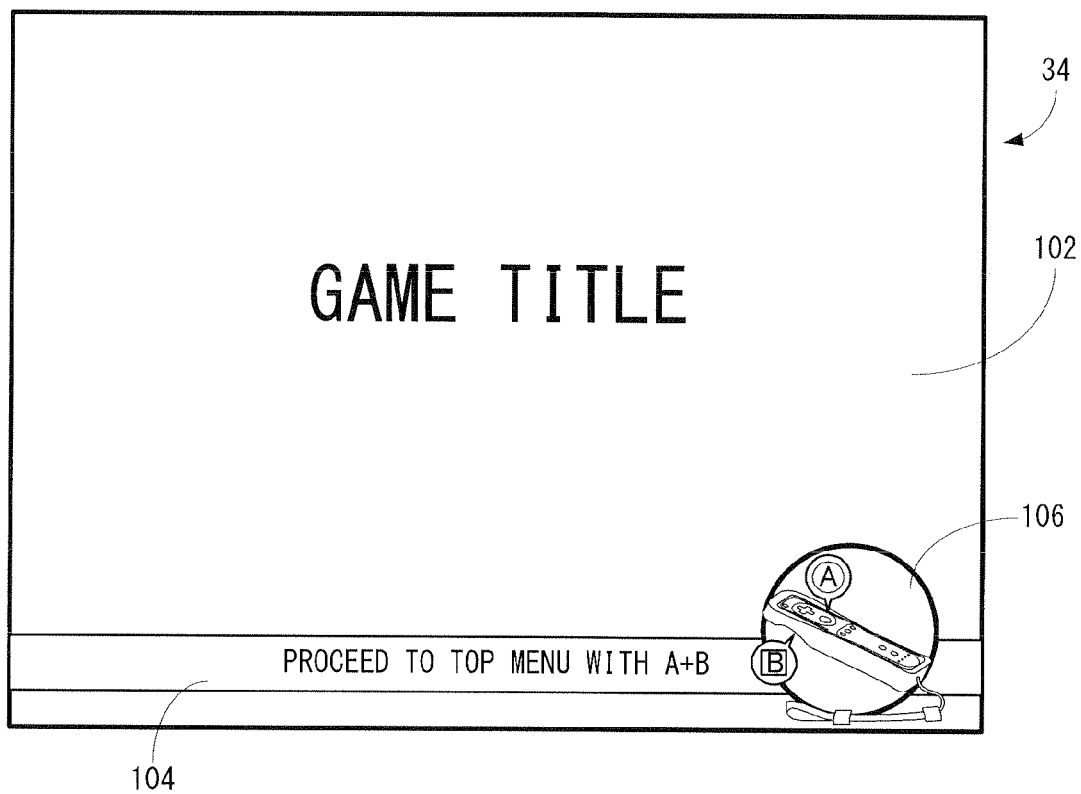
FIG. 9 shows an example non-limiting title screen to be displayed on the monitor shown in FIG. 1.

In the game system 10 of such a kind, when execution of a game application (virtual game) of this embodiment is selected (instructed), a title screen 100 as shown in FIG. 9 is displayed as an initial screen on the monitor 34. On the title screen 100, a display region 102 is provided on the entire screen, and in the display region 102, a character string of a game title is displayed, and images of characters or objects appearing in a main part of the virtual game, for example, are also displayed although illustration is omitted.

It should be noted that on the actual title screen 100, in place of the character string of "game title", a character string of a title of the virtual game is displayed.

Furthermore, at the bottom of the title screen 100, a display region 104 is provided in front of the display region 102. In the display region 104, a message indicating an operation method, or a predetermined key, button or switch to be operated (hereinafter, referred to as "predetermined key or the like") to shift to a top menu is displayed. In addition, at the bottom right of the title screen 100, an image (hereinafter, referred to as "operation guide image") 106 representing an operation method or a predetermined key or the like to be operated to shift to the top menu is displayed in front of the display region 104.

Figure 10:
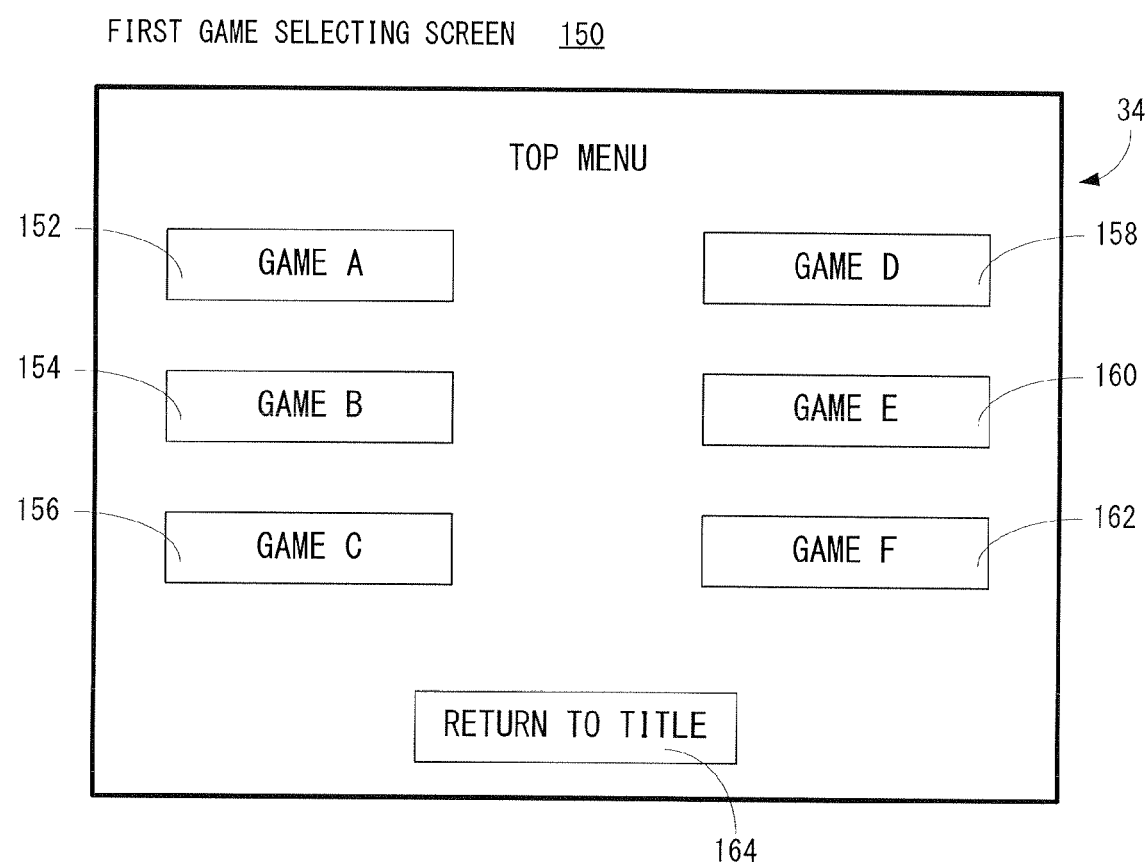
FIG. 10 shows an example non-limiting first game selecting screen to be displayed on the monitor shown in FIG. 1.

When a predetermined key or the like (both of the A button 26d and the B trigger switch 26i here) is turned on with the title screen 100 displayed, a shift to the top menu is made. That is, a first game selecting screen 150 as shown in FIG. 10 is displayed on the monitor 34. The first game selecting screen 150 is a screen for selecting a first game capable of being played in the main part of the virtual game of this embodiment. For example, the first game is a plurality of mini games (game A, game B, game C, game D, game E and game F in this embodiment). Here, this is merely one example, and the number and the kind of the first game should not be restricted thereto.

As understood with reference to FIG. 10, in the top center of the first game selecting screen 150, a character string of "top menu" indicating a screen for selecting the first game is displayed. Also, below the character string of "top menu", a button image 152, a button image 154, a button image 156, a button image 158, a button image 160, a button image 162 and a button image 164 are displayed.

The button images 152-162 are provided in order to select (start) corresponding games A-F. Accordingly, when the player selects any one of the button images 152-162 using the controller 22 (turns it on), the game (A-F) corresponding the button image (152-162) which is turned on is started.

A button image 164 is provided in order to return to the title screen 100 shown in FIG. 9. Accordingly, when the button image 164 is turned on, the title screen 100 is displayed on the monitor 34 in place of the first game selecting screen 150.

For example, in the aforementioned first game, by using at least angular velocity data out of the controller data transmitted from the controller 22, game processing is executed. In the gyro sensor 92, with reference to an output in a still and stable state (output at a standstill), the output voltage becomes high when the rotational velocity is a positive direction, and the output voltage becomes low when the rotational velocity is a negative direction. Accordingly, when an error is included in an output at a standstill, an error is also included in the angular velocity indicated by the angular velocity data output from the gyro sensor 92. Thus, the gyro sensor 92 is brought into a stable state, to thereby obtain an accurate output at a standstill of the gyro sensor 92, capable of obtaining an accurate angular velocity.

Here, the gyro sensor 92 may have a reference value (zero point) for outputting angular velocity data about the X axis, the Y axis and the Z axis as a fixed value, but an actual output at a standstill and the fixed value may be differentiated. Furthermore, even after the output at a standstill is decided, the output of the gyro sensor 92 may vary with the passage of time, and in this case, the output at a standstill also varies with the passage of time (drift phenomenon). In order to reduce such an error of the output at a standstill, whether or not the attitude of the gyro sensor 92 is stable (stable state) is confirmed. Here, the stability of the attitude of the gyro sensor 92 means that the attitude of the gyro sensor 92 keeps standstill, and an output from the gyro sensor 92 in this state, that is, an output at a standstill is acquired. Then, the stable state means that the state in which the attitude of the gyro sensor 92 is made standstill continues to thereby continuously acquire an output at a standstill. In this embodiment, the gyro unit 24 is connected to the controller 22, and thus, if the attitude of the controller 22 connected with the gyro unit 24 is made standstill, the attitude of the gyro sensor 92 is made also standstill. Accordingly, a confirmation of the stable state of the gyro sensor 92 can be said to be a confirmation of the stable state of the controller 22.

Figure 11:
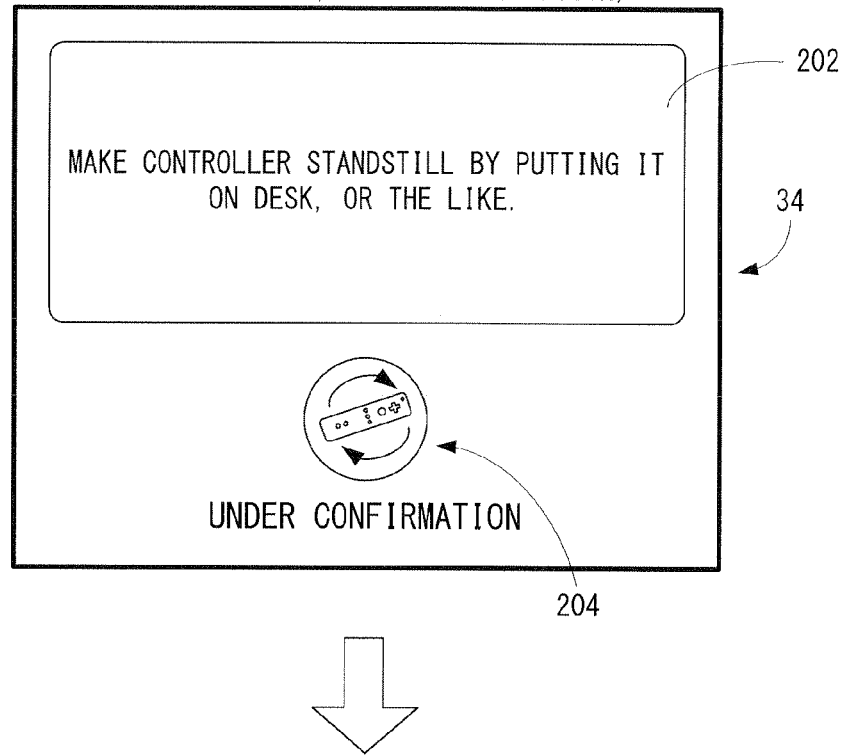
FIG. 11 shows an example non-limiting stability confirmation screen to be displayed on the monitor shown in FIG. 1.
Figure 11:
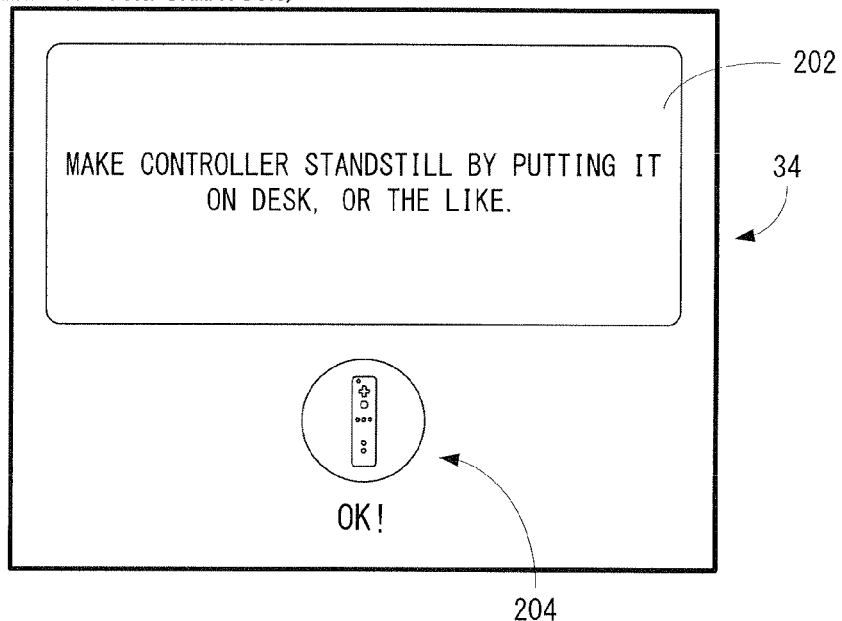

Accordingly, normally when a start of the first game (any one of the games A-F) is instructed, stability confirmation processing is executed before starting the game processing. When the stability confirmation processing is started, a stability confirmation screen 200 as shown in FIG. 11(A) is displayed on the monitor 34. On the stability confirmation screen 200, at the upper half thereof, a display region 202 is provided, and below the display region 202, a state confirming image 204 is displayed.

In the display region 202, a message for instructing the player to put the controller 22 on a desk or the like to make it standstill (a state that the attitude is stable) is displayed. Although illustration is omitted, an image in which the controller 22 is put on a desk may be displayed. The state confirming image 204 includes an image representing whether or not the controller 22 is in the stable state, and a character string indicating whether the controller 22 is in the stable state is being confirmed or has been confirmed.

For example, as shown in FIG. 11(A), during the confirmation of the stable state, in the state confirming image 204, an animation in which an image imitating the controller 22 is rotating is displayed, and a character string of "UNDER CONFIRMATION" is displayed below the image. When the stable state is confirmed, in the state confirming image 204, a still image of the image imitating the controller 22 is displayed, and a character string of "OK!" is displayed below the image as shown in FIG. 11(B). Although illustration is omitted, when the stable state is confirmed, the first game selected in the aforementioned top menu is started.

It should be noted that in this embodiment, when the stability confirmation processing is once performed, and the process returns to the top menu to select another first game, the other first game is started directly. It should be noted that every time that the first game is selected on the top menu, the stability confirmation processing may be executed, or every time that a predetermined time (30 minutes for example) has elapsed or every time that game play is performed by a predetermined number of times (10 times, for example), the stability confirmation processing may be executed.

Here, an actual stability confirmation processing is described. When the stability confirmation processing is started, angular velocity data included in the controller data transmitted from the controller 22 is detected, and by using the detected angular velocity data, angle data is calculated. That is, an angle about each of the X axis, the Y axis and the Z axis is calculated, whereby, the current attitude of the controller 22 is detected. Such processing like detection or the like is performed every frame.

Next, it is determined whether or not the controller 22 is at a standstill. Here, it is determined whether or not the difference between the angle data of the present frame (current frame) and angle data directly before (previous frame) is equal to or less than a predetermined value. Here, the determination is performed on the angle about each of the X axis, the Y axis and the Z axis. Also, since whether or not the controller 22 is at a standstill is determined, the predetermined value is set to a value closed to 0.

In a case that the difference between the angle data of the current frame and the angle data of the previous frame is equal to or less than the predetermined value, it is determined that the controller 22 is at a standstill, and the number of counts as to this state is added by one. The determination as to whether the controller 22 is at a standstill is repetitively performed, and when the number of counts is equal to or more than a predetermined number (threshold value P), it is determined that the stable state is confirmed. Here, the predetermined number (threshold value P) is a value enough to obtain an output at a standstill.

It should be noted that in a case that the angular velocity data cannot be acquired, or in a case that the difference between the angle data of the current frame and the angle data of the previous frame is above the predetermined value, that is, in a case that it is determined that the controller 22 is not at a standstill, the number of counts is reset.

Furthermore, it takes some time before the angular velocity data included in the controller data transmitted from the controller 22 is corrected as described later, and the value of the output at a standstill (zero point offset value ofs) is stabilized. Also, when the number of times that it is determined that the controller 22 is at a standstill is equal to or more than the predetermined number (threshold value P), a stable state is confirmed, and therefore, it also takes some time to perform the confirmation processing.

It should be noted that the above-described stability confirmation processing is also executed while the title screen 100 is displayed on the monitor 34. Accordingly, in a case that the title screen 100 is displayed, when the controller 22 is put on the desk or the like to bring it into a standstill, and the stable state is confirmed, if the first game is selected thereafter on the top menu, the game processing of the first game is started without performance of the stability confirmation processing.

Furthermore, in this embodiment, in a case that the title screen 100 is displayed on the monitor 34, an left state continues for a predetermined time or more (10 seconds, for example) after confirmation of the stable state, a second game different from the first game to be played in the main part is started.

In this embodiment, the "left state" here means a state that a predetermined key or the like (both of the A button 26d and the B trigger switch 26i in this embodiment) of the controller 22 is not operated.

The second game is also a game executing game processing by using the angular velocity data. In this embodiment, two kinds of the second game are prepared. For example, the second game is a game for learning and practicing an operation method for playing the first game. Here, a special game which can be played when all the first games are cleared may be added as a second game.

Figure 12:
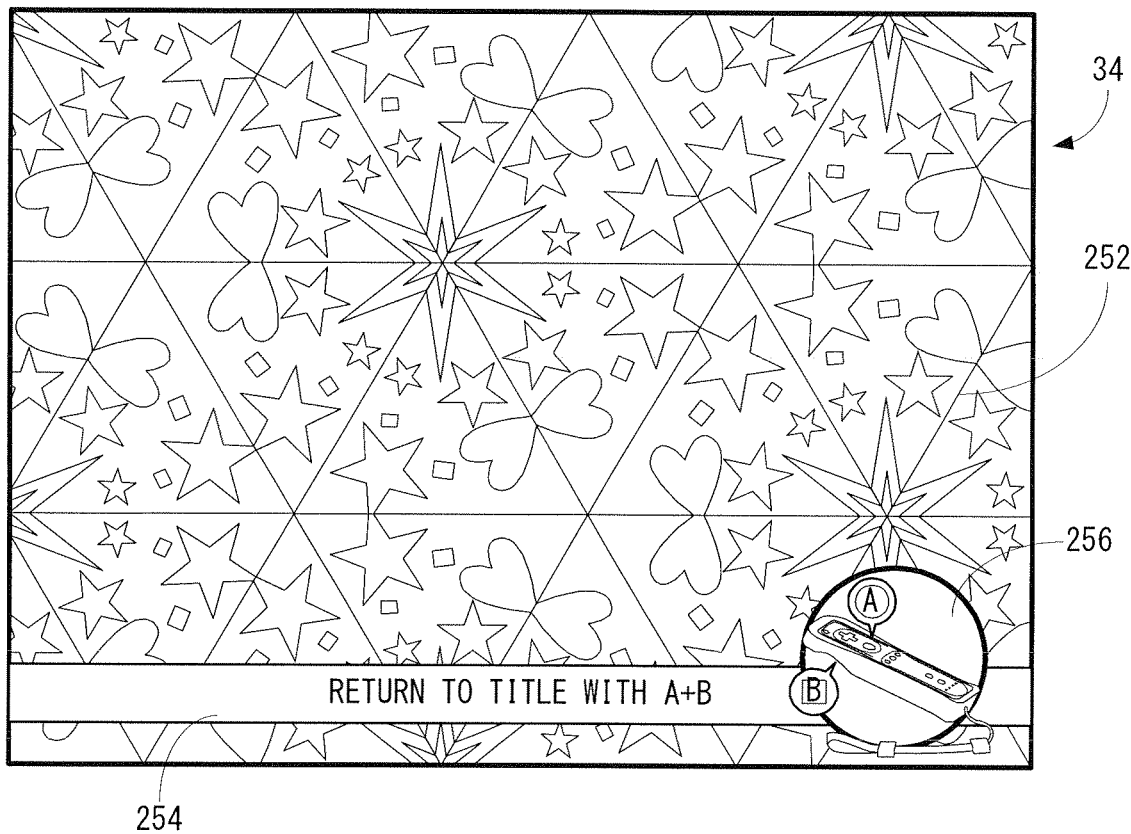
FIG. 12 shows an example non-limiting second game screen to be displayed on the monitor shown in FIG. 1.

FIG. 12 shows a second game screen 250 with respect to the one of the second game. In the second game, the controller 22 is used to resemble a kaleidoscope, and a pattern when the player looks into the kaleidoscope is displayed on the second game screen 250 (monitor 34). Accordingly, on the second game screen 250 shown in FIG. 12, a predetermined pattern is displayed on the display region 252 set to the entire screen. Furthermore, at the bottom of the second game screen 250, a display region 254 for displaying a message indicating an operation method, a predetermined key to be operated or the like to return to the title screen 100 is provided in front of the display region 252. This holds true for a display region 304 (see FIG. 13) described later. In addition, at the right bottom of the game screen 250, an operation guide image 256 indicating an operation method or a predetermined key to be operated or the like to return to the title screen 100 is displayed in front of the display region 254. This holds true for an operation guide image 306 (see FIG. 13) described later.

Although illustration is omitted, for example, in the second game relating to the kaleidoscope, when the player rotates the controller 22 about the Z axis, a virtual kaleidoscope is rotated to thereby change the pattern displayed on the second game screen 250 in accordance therewith. Although detailed description is omitted, when the roll angle is increased in the minus direction in a state shown in FIG. 4(A), it is determined that the controller 22 is rotated to the left direction about the Z axis. Furthermore, if the roll angle is increased in the plus direction, it is determined that the controller 22 is rotated to the right direction about the Z axis.

Additionally, when the player turns the leading end surface of the controller 22 upward, the background of the second game screen 250 (display region 252) is made bright (whitened), and when the player turns the leading end surface of the controller 22 downward, the background of the second game screen 250 (display region 252) is made dark. Although a detailed description is omitted, if the pitch angle is increased in the minus direction in the state shown in FIG. 4(A), it is determined that the leading end surface of the controller 22 is turned upward. On the other hand, if the pitch angle is increased in the plus direction, it is determined that the leading end surface of the controller 22 is turned downward.

In addition, if the player turns the leading end of the controller 22 right and left, a hue of the background of the second game screen 250 (display region 252) is changed. Although a detailed description is omitted, if the yaw angle is increased in the minus direction in the state shown in FIG. 4(A), it is determined that the leading end surface of the controller 22 is turned to the left direction. On the other hand, if the yaw angle is increased in the plus direction, it is determined that the leading end surface of the controller 22 is turned to the right direction.

Figure 13:
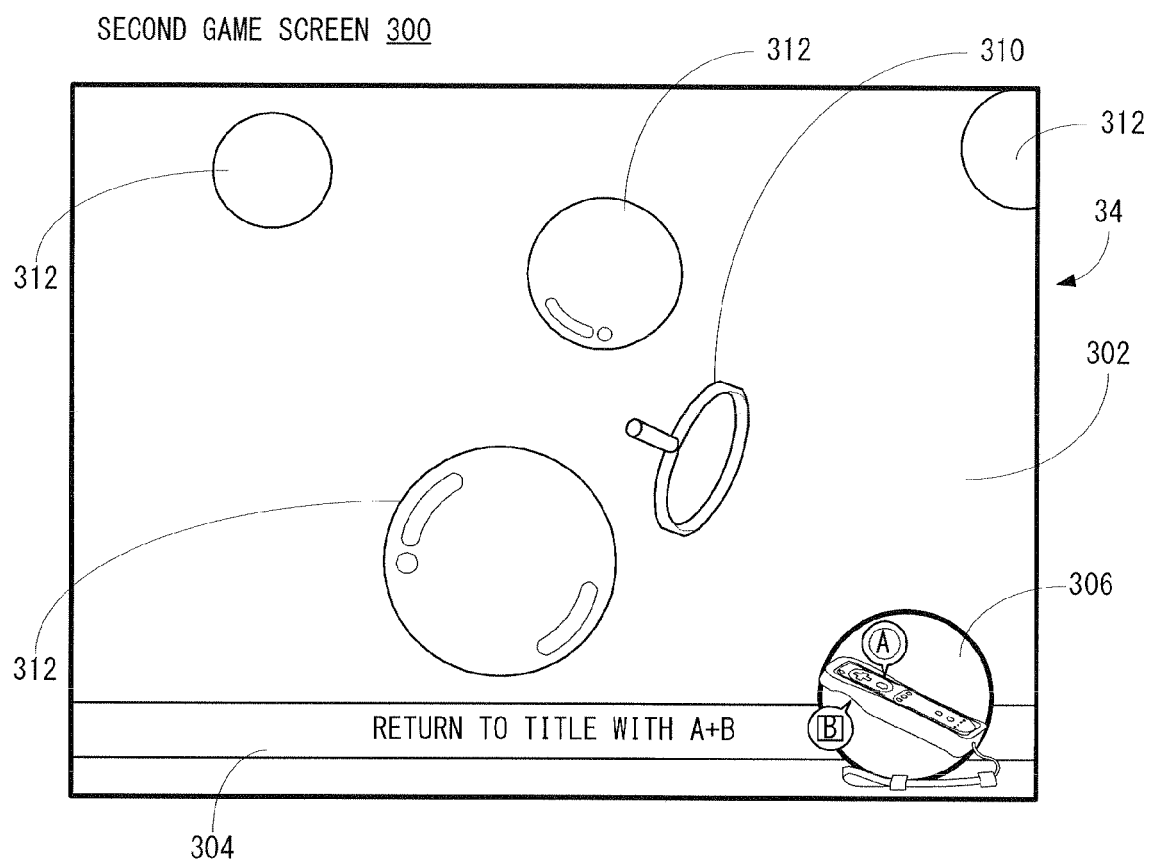
FIG. 13 shows another example non-limiting second game screen to be displayed on the monitor shown in FIG. 1.

Alternatively, FIG. 13 shows a second game screen 300 with respect to the other of the second game. In the second game, the controller 22 is used to resemble a ring for producing soap bubbles, and the controller 22 is freely moved to thereby produce soap bubbles, and the soap bubbles are displayed on the second game screen 300 (monitor 34). Accordingly, on the second game screen 300 shown in FIG. 13, on a display region 302 of the entire screen, an object imitating a ring (ring object) 310 and objects (soap bubble objects) 312 imitating the produced soap bubbles are displayed. Also, at the bottom of the second game screen 300, the display region 304 is provided in front of the display region 302. In addition, the operation guide image 306 is displayed at the lower right of the game screen 300 in front of the display region 304.

For example, in the second game relative to the soap bubbles, when the player moves the controller 22, the ring object 310 in the game screen 300 is moved or changed in direction in conjunction with the movement. Although a detailed description is omitted, a movement and a rotation of the ring object 310 are controlled on the basis of the angular velocity data included in the controller data transmitted from the controller 22.

When the ring object 310 in the game screen 300 is slowly moved, a soap film (not illustrated) is extended long from the ring object 310 to produce a large soap bubble. Here, when the soap bubble takes a predetermined size (length), it is released from the ring object 310. On the other hand, when the ring object 310 in the game screen 300 is moved rapidly, the soap film is immediately released from the ring object 310 to produce a small soap bubble.

When the soap bubble is produced, it moves to the depth of the game screen 300, and thus, the soap bubble objects 312 are not contact (collide) with each other. Furthermore, the soap bubble object 312 produced once bursts after a lapse of a predetermined time (3 to 5 seconds, for example), or disappears by being moved upward out of the screen.

The second game as to the kaleidoscope and the soap bubbles is playable only for a predetermined time (90 seconds, for example). For example, when the predetermined time has elapsed to end the second game, the screen of the monitor 34 is blacked out and returns to the title screen 100.

Here, during playing the second game, when the predetermined key or the like (both of the A button 26d and the B trigger switch 26i in this embodiment) is operated, the second game is ended in the middle, and the screen of the monitor 34 is blacked out and then returns to the title screen 100.

Figure 14:
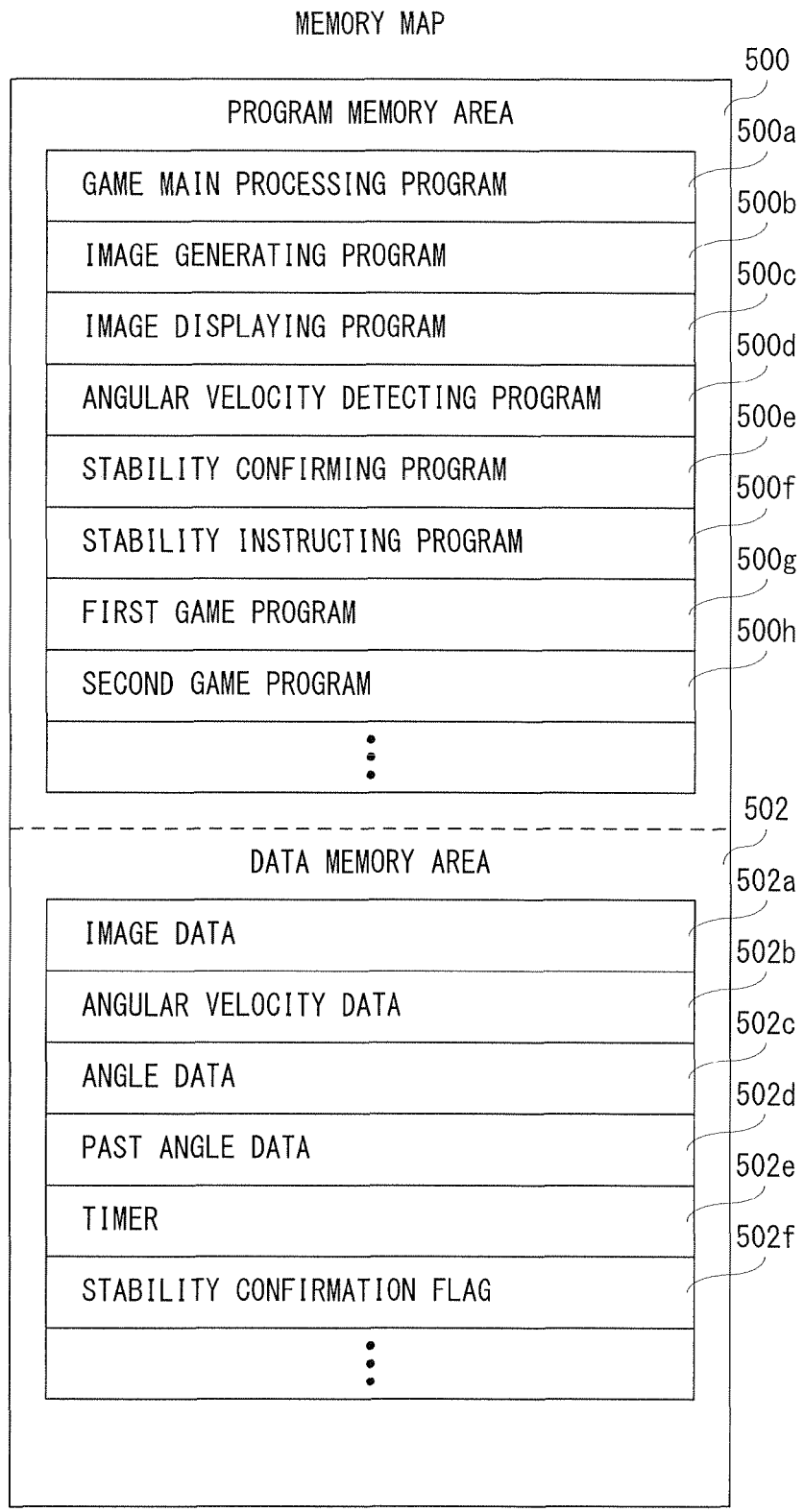
FIG. 14 shows an example non-limiting memory map of a main memory shown in FIG. 2.

FIG. 14 shows an example showing a memory map of the main memory (42e or 46) shown in FIG. 2. As shown in FIG. 14, the main memory (42e or 46) includes a program memory area 500 and a data memory area 502. The program memory area 500 stores a game program, and the game program is made up of a game main processing program 500a, an image generating program 500b, an image displaying program 500c, an angular velocity detecting program 500d, a stability confirming program 500e, a stability instructing program 500f, a first game program 500g and a second game program 500h, etc.

The game main processing program 500a is a program for processing a main routine of the virtual game of this embodiment. The image generating program 500b is a program for generating game image data to display various screens (100, 150, 200, 250, 300, etc.) on the monitor 34 by using image data 502a described later. The image displaying program 500c is a program for displaying (outputting) game image data generated by the image generating program 500b on the monitor 34.

The angular velocity detecting program 500d is a program for detecting (taking) angular velocity data from the controller data transmitted from the controller 22. Here, the angular velocity detecting program 500d is a program for correcting the angular velocity. Also, the angular velocity detecting program 500d calculates an angle taken by accumulating the angular velocities corresponding to the detected angular velocity data. The stability confirming program 500e is a program for confirming a stable state of the controller 22. The stability instructing program 500f is a program for presenting an instruction that the stable state of the controller 22 should be confirmed.

The first game program 500g is a game program of the first game, and is stored for each of the games A to F. The second game program 500h is a game program of the second game, and is stored for each of the two kinds of the second game.

Although illustration is omitted, in the program memory area 500, a sound output program, a backup program, etc. are stored. The sound output program is a program for generating and outputting a sound necessary for the game, such as voices (onomatopoeic sound) of the player object and the non-player object, a sound effect, music (BGM), etc. by using sound data and acoustic wave-shaped data. The backup program is a program for storing game data (proceeding data, result data) in the flash memory 44 and a memory card according to an instruction from the player and a predetermined game event.

In the data memory area 502, image data 502a, angular velocity data 502b, angle data 502c and past angle data 502d are stored. Furthermore, in the data memory area 502, a timer 502e and a stability confirmation flag 502f are provided.

The image data 502a is data as to polygon data, texture data and objects. The angular velocity data 502b is data of an angular velocity included in the controller data transmitted from the controller 22. As described above, the angular velocity data included in the controller data is accumulated in a buffer (not illustrated) provided to the wireless controller module 52, and the angular velocity data accumulated in the buffer is read every frame to thereby update the angular velocity data 502b of the main memory (42e, 46). That is, the angular velocity data 502b is data of the angular velocity about each of the X axis, Y axis, Z axis at the current frame that is set to the controller 22.

It should be noted that the angular velocity data 502b is subject to predetermined correction before being stored in the main memory (42e, 46). Here, correction processing or a correction method of the angular velocity data 502b is described.

It should be noted that the correction processing or the correction method of the angular velocity data is disclosed in detail in a Japanese Patent Application Laying-Open No. 2010-19751 filed earlier by this applicant and has already been laid-open, and therefore, a brief description is made here.

First, the angular velocity v indicated by the angular velocity data that is output from the gyro sensor 92 is subjected to first order correction according to Equation 1. It should be noted that the angular velocity v is an angular velocity of one axis out of the three axes. Here, a description of the correction processing (correction method) of the angular velocity v as to one axis is described, but this holds true for the other axes. Also, "=" means substitution in Equation 1 (this holds true for Equation 2, and Equation 3).

$$v = v + (\text{sum}/ct - v) \times a \quad \text{[Equation 1]}$$

Here, ct is the number of angular velocities v (data of the angular velocity v) (consecutive times ct) that the angular velocity is determined to successively fall in a stable range set between d1 (a lower limit) and d2 (an upper limit), going back from the current frame. It should be noted that the data of the angular velocity v is stored in a buffer (not illustrated) provided in the data memory area 502 in chronological order every frame. Furthermore, sum is a total value of the values of the angular velocities that are determined to fall in the above-described stable range. Here, the maximum number (upper limit of the searches) of angular velocities to be searched is preset. Also, a indicates a standstill degree value. The standstill degree value a is an index to indicate the degree of steadiness of the gyro sensor 92, and set between 0 and 1. The longer the period during which the movement of the gyro sensor 92 changes little (is stable), the closer the standstill degree value a is to 1. Then, the standstill degree value a is normalized to take a maximum value (1) when all the values of the angular velocity data, which go back from the current frame, by the number of the upper limit (400, for example) of the searches fall in the aforementioned stable range. Here, by calculating the standstill degree value a to the k power (k≥1) ($a^k$), the difference between when the state that the movement of the controller 22 (gyro sensor 92) is less continues for a long period, that is, when the consecutive times et is more (large) and when the consecutive times ct is less (small) may be made great. That is, the standstill degree value a is directly used to thereby be merely proportion to the consecutive times ct, but the standstill degree value a is exponentiated or risen (to the k power, for example) to thereby set such that the standstill degree value an exponentially changes with respect to the consecutive times ct.

Then, a zero point offset value (output value at a standstill) ofs is subtracted from the angular velocity v after the aforementioned first order correction to thereby perform an offset correction (calibration). Here, the zero point offset value ofs is a value of the angular velocity data which is supposed to be indicated when the gyro sensor 92 is at a standstill, and the initial value is set to a preset value dedicated to the device, but is reset (updated) in correspondence with the angular velocity v after the aforementioned first order correction. More specifically, according to Equation 2, the zero point offset value ofs is sequentially corrected and reset.

$$ofs=ofs+(v-ofs) \times a \times C \quad \text{[Equation 2]}$$

Here, C is a constant, and is set to 0.01, for example. Setting the constant C to a small value prevents the angular velocity v from being corrected to the zero point in which the controller 22 is at a standstill for a short period. Furthermore, the drift phenomenon being the cause of the differences among outputs at a standstill is not a phenomenon of a sharp change, and a quick response is not required. Thus, by setting the constant C to a small value, it is possible to acquire the zero point offset value ofs with high accuracy.

It should be noted that depending on the kind of the game using the controller 22 connected with the gyro unit 24, the value of the constant C may be changed. For example, as the value acquired by multiplying the standstill degree value a by the constant C is large, that is, the period of the stable state during which the movement of the controller 22 (gyro sensor 92) changes little is long, the zero point offset value ofs is corrected to a value close to the angular velocity v after the aforementioned first order correction. Accordingly, if the controller 22 (gyro sensor 92) is at a standstill, the zero point offset value has a high probability of converging to the angular velocity v after the aforementioned first order correction. That is, in a case that the angular velocity changes little as in the gyro sensor 92 at the stand still, a correction of the zero point is performed such that the zero point is close to an average value. That is, if the controller 22 is at a standstill at least once, the error of the angular velocity thereafter is removed by the correction. Accordingly, in this embodiment, by executing a confirmation of the stable state in advance, the first game and the second game can be performed with the error of the gyro sensor 92 corrected.

Then, the angular velocity v after the aforementioned first order correction is subjected to an offset correction by using the zero point offset value ofs. More specifically, the angular velocity v after the first order correction is subjected to the offset correction according to Equation 3.

$$v=v-ofs \quad \text{[Equation 3]}$$

Thus, the angular velocity v indicated by the angular velocity data output from the gyro sensor 92 is corrected again taking the zero point (output at a standstill) into consideration. Then, by using the aforementioned offset corrected angular velocity v, the angular velocity data 502b is updated as necessary.

The angle data 502c is data of an angle (attitude) about each axis acquired by accumulating the angular velocities corresponding to the angular velocity data 502b. The past angle data 502d is used for calculating a change amount of the angle, and data indicating an angle (attitude) about each axis calculated in the past (one frame before).

The timer 502f is a timer for counting a time (10 seconds, for example) during which the controller 22 is left, and a time (90 seconds, for example) during which the second game is playable. Here, the individual timers may be provided for applications.

The stability confirmation flag 502f is a flag for determining whether or not a stable state is confirmed, and is formed of one bit register. When the stability confirmation flag 502f is turned on, a data value "1" is stored in the register. On the other hand, when the stability confirmation flag 502f is turned off, a data value "0" is stored in the register. Furthermore, when a stable state of the corresponding controller 22 is confirmed, the stability confirmation flag 502f is turned on, and when the stable state of the corresponding controller 22 is not confirmed, the stability confirmation flag 502f is turned off.

Although illustration is omitted, in the data memory area 502, other data necessary for the game processing may be stored, or other timers (counters) and other flags necessary for the game processing may be provided.

Figure 15:
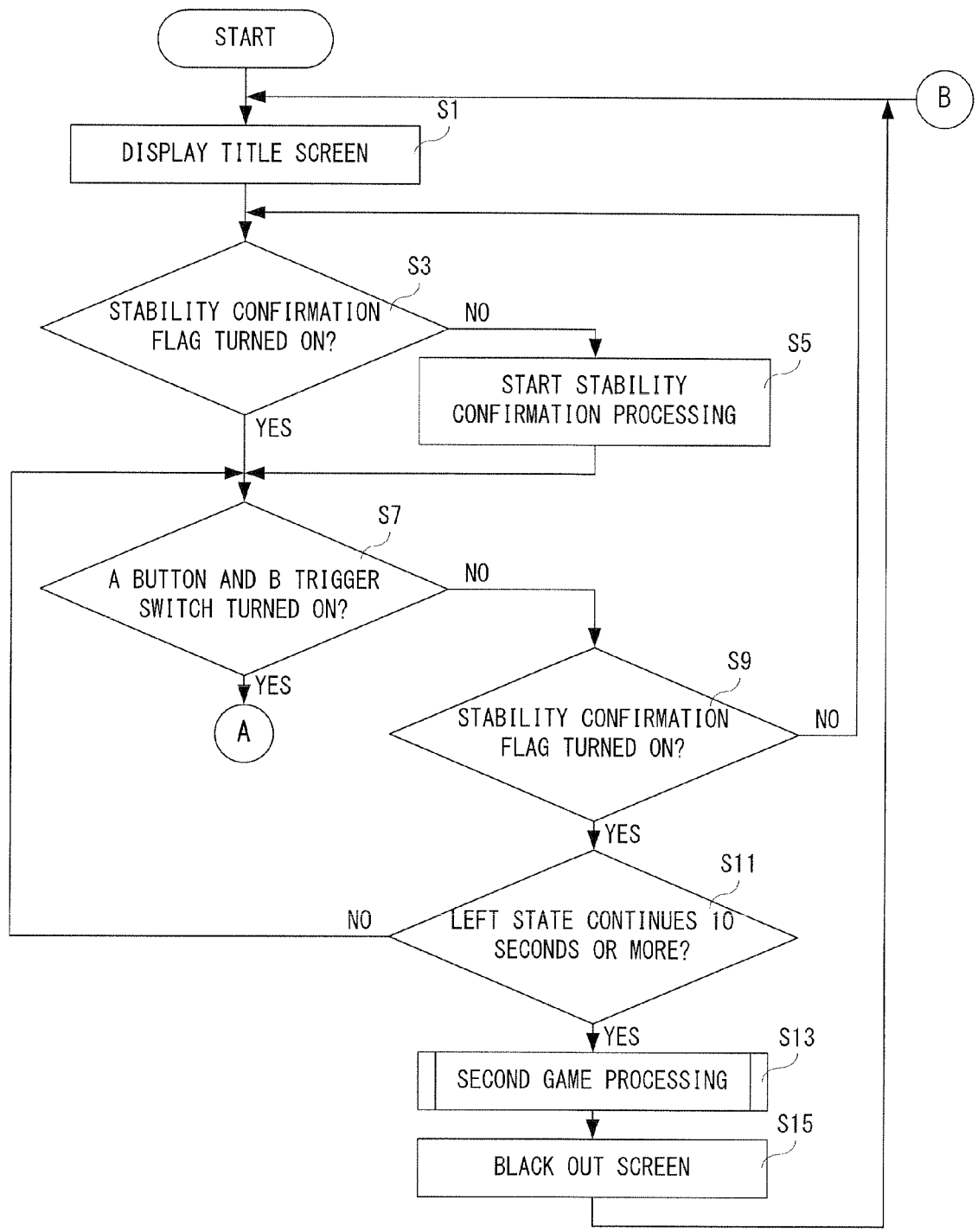
FIG. 15 shows an example non-limiting flowchart showing a part of game entire processioning by a CPU shown in FIG. 2.
Figure 16:
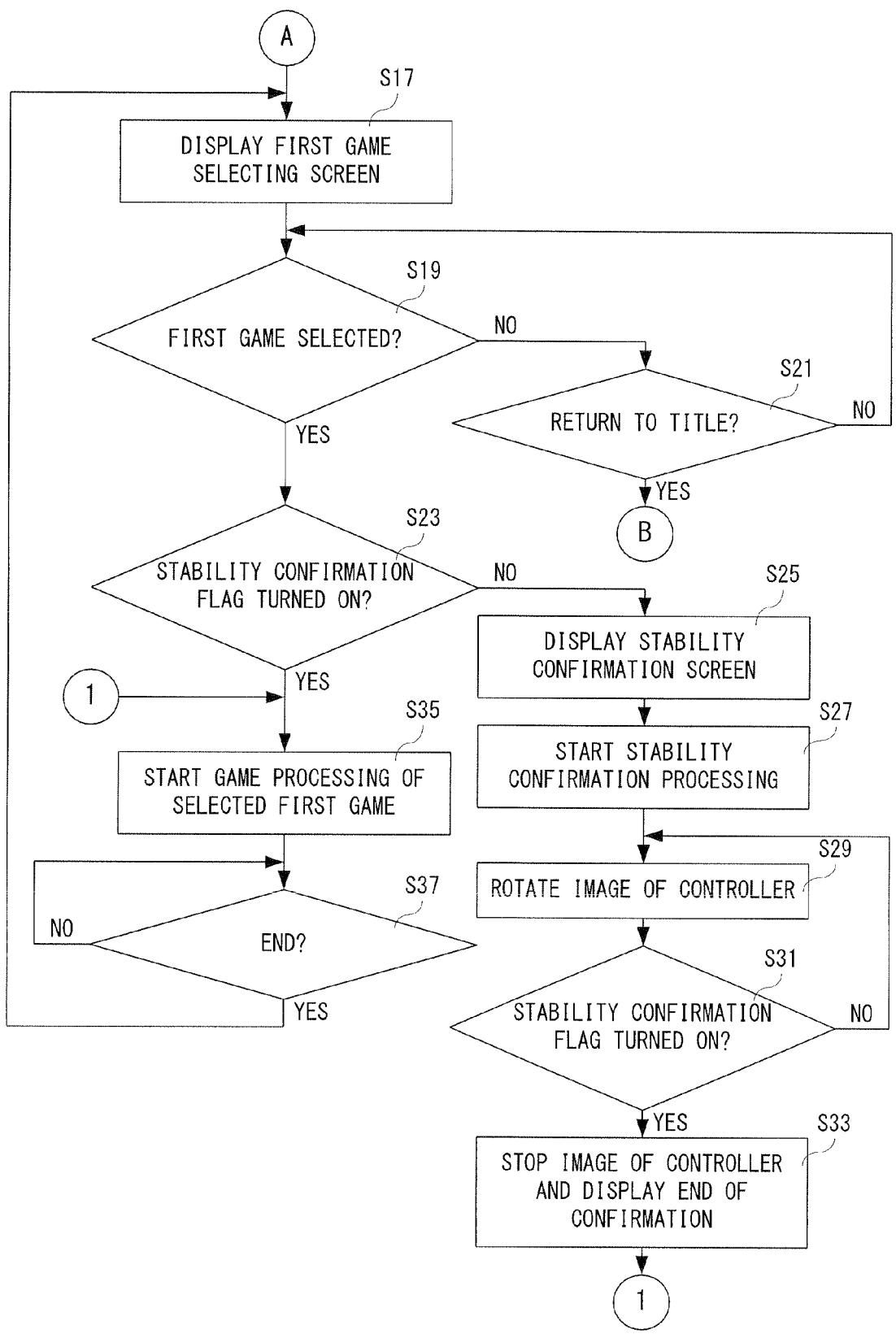
FIG. 16 shows another example non-limiting flowchart showing the game entire processioning by the CPU shown in FIG. 2 being sequel to FIG. 15.

More specifically, the CPU 40 shown in FIG. 2 executes game entire processing shown in FIG. 15 and FIG. 16. As shown in FIG. 15, when starting the game entire processing, the CPU 40 displays the title screen 100 as shown in FIG. 9 on the monitor 34 in a step S1. In a next step S3, it is determined whether or not the stability confirmation flag 502f is turned on. Here, when the game entire processing is first started, the stability confirmation flag 502f is turned off.

If "YES" in the step S3, that is, if the stability confirmation flag 502f is turned on, the process proceeds to a step S7 as it is. On the other hand, if "NO" in the step S3, that is, if the stability confirmation flag 502f is turned off, stability confirmation processing (see FIG. 18) is started in a step S5, and the process proceeds to the step S7. Accordingly, in a case that the stability confirmation flag 502f is turned off, if the title screen 100 is displayed as well, the stability confirmation processing is executed. Here, the stability confirmation processing is executed in parallel by a task different from the game entire processing.

In the step S7, it is determined whether or not both of the A button 26d and the B trigger switch 26i are turned on. Here, the CPU 40 determines whether the A button 26d and the B trigger switch 26i are simultaneously operated by detecting the operation data included in the controller data. If "YES" in the step S7, that is, if both of the A button 26d and the B trigger switch 26i are turned on, the process proceeds to a step S15 shown in FIG. 16. On the other hand, if "NO" in the step S7, that is, if at least one of the A button 26d and the B trigger switch 26i is not turned on, it is determined whether or not the stability confirmation flag 502f is turned on in a step S9.

If "NO" in the step S9, the process returns to the step S3 as it is. On the other hand, if "YES" in the step S9, it is determined whether or not the left state continues for 10 seconds or more in a step S11. That is, the CPU 40 determines whether or not a state that at least one of the A button 26d and the B trigger switch 26i is not turned on continues for 10 seconds or more.

Although illustration is omitted, when the stability confirmation flag 502f changes from OFF to ON, the timer 502e starts to count according to an instruction from the CPU 40.

If "NO" in the step S11, that is, if it is not in the left state or if the left state does not continue for 10 seconds or more, the process returns to the step S7 as it is. On the other hand, if "YES" in the step S11, that is, if the left state continues for 10 seconds or more, second game processing (see FIG. 16) described later is executed in a step S13, the screen is blacked out in the step S15, and the process returns to the step S1. Although illustration is omitted, the timer 502e is reset and started at this time.

As shown in FIG. 16, in a step S17, the first game selecting screen 150 as shown in FIG. 10, that is, the top menu is displayed on the monitor 34. In a succeeding step S19, it is determined whether or not the first game is selected. That is, the CPU 40 determines whether or not any one of the button images 152 to 162 is turned on. If "NO" in the step S19, that is, if the first game is not selected, it is determined whether or not a return to the title is selected in a step S21. That is, the CPU 40 determines whether or not the button image 164 is turned on. If "NO" in the step S21, that is, if a return to the title is not selected, the process returns to the step S19 as it is. On the other hand, if "YES" in the step S21, that is, if a return to the title is selected, the process returns to the step S1 shown in FIG. 15. Here, in a case that the stability confirmation flag 502f is turned on at this time, the timer 502e is reset and started.

Furthermore, if "YES" in the step S19, that is, if the first game is selected, it is determined whether or not the stability confirmation flag 502f is turned on in a step S23. If "YES" in the step S23, the process proceeds to a step S35 as it is. On the other hand, if "NO" in the step S23, the stability confirmation screen 200 as shown in FIG. 11(A) is displayed on the monitor 34 in a step S25 to thereby start the stability confirmation processing in a step S27. In addition, in a step S29, the image of the controller 22 is rotated. That is, as shown in FIG. 11(A), in the state confirming image 204 of the stability confirmation screen 200, an animation in which an image imitating the controller 22 is rotating is displayed.

In a succeeding step S31, it is determined whether or not the stability confirmation flag 502f is turned on. If "NO" in the step S31, the process returns to the step S29 as it is. On the other hand, if "YES" in the step S31, the image of the controller 22 is stopped, and an end of the confirmation is displayed in a step S33, and the process proceeds to the step S35. That is, as shown in FIG. 11(B), in the state confirming image 204 of the stability confirmation screen 200, a still image of the image imitating the controller 22 is displayed, and a character string of "OK!" is displayed below the image.

In the step S35, the game processing of the selected first game is started. Although omitted in the drawing, the game processing of the first game is executed in parallel in a task different from the game entire processing. Also, the first game is a game of executing the game processing by using at least angular velocity data of the controller data transmitted from the controller 22.

Then, in a step S37, it is determined whether or not the first game is to be ended. If "NO" in the step S37, that is, if the first game is not to be ended, the process returns to the step S37 as it is. On the other hand, if "YES" in the step S37, that is, if the first game is to be ended, the process returns to the step S17.

Figure 17:
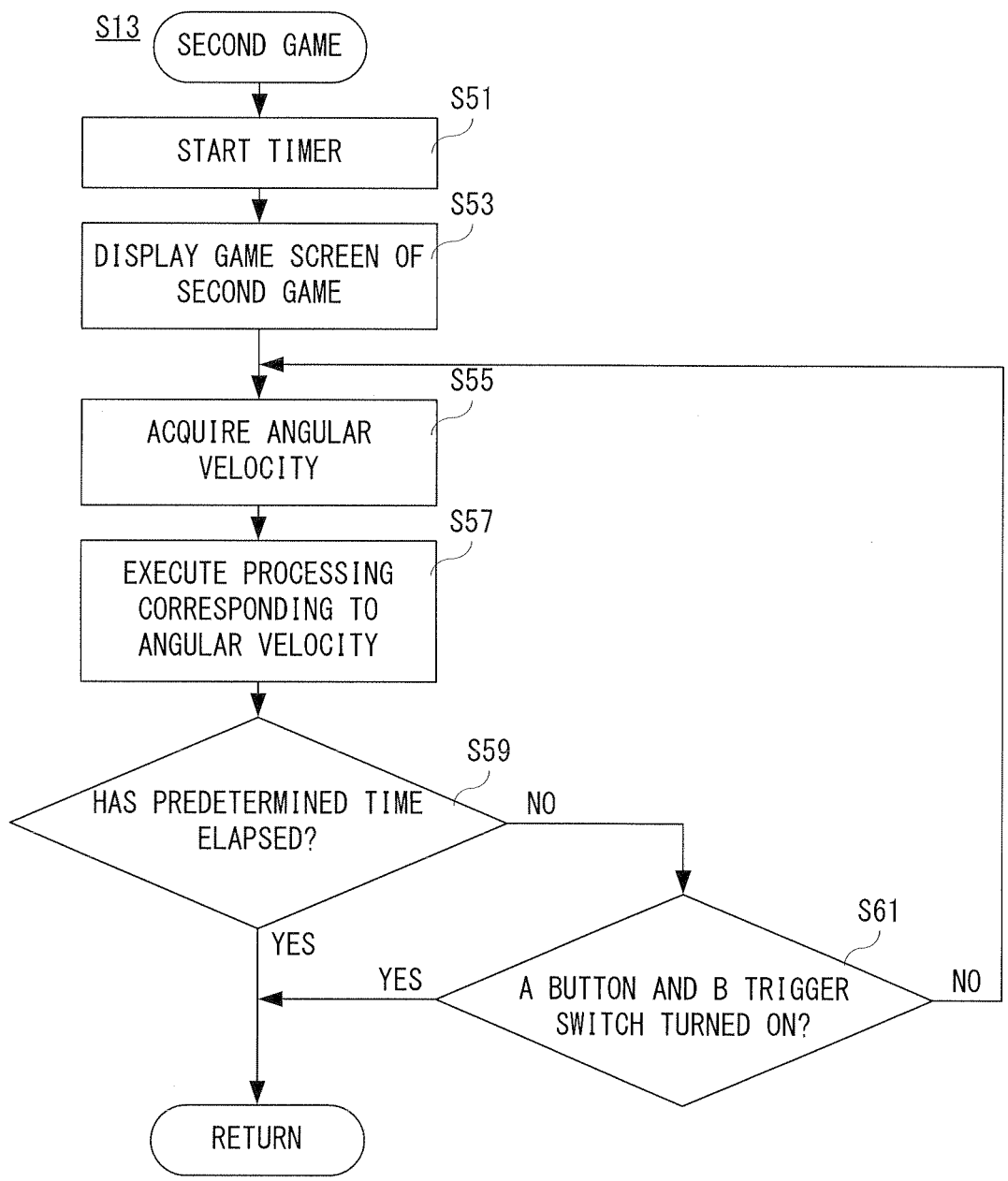
FIG. 17 shows an example non-limiting flowchart showing second game processing by the CPU shown in FIG. 2.

FIG. 17 is a flowchart showing the second game processing in the step S13 shown in FIG. 15. Here, for simplicity, a description is made so as to be applied to both of the second game of the kaleidoscope and the second game of the soap bubbles as described above, but different processing is actually executed in each second game.

As shown in FIG. 17, when starting the second game processing, the CPU 40 starts the timer 502e in a step S51. That is, counting the playing time of the second game is started. Here, in this embodiment, two kinds of games are prepared as a second game, and the game processing of the second game which was not played in the previous play is started.

In a next step S53, the game screen of the second game (250 or 300) is displayed on the monitor 34. In a succeeding step S55, an angular velocity is acquired. That is, the angular velocity data 502b stored in the data memory area 502 is acquired. In a following step S57, processing based on the angular velocity is executed. In the step S57, the different processing is executed as to the second game of the kaleidoscope and the second game of the soap bubbles as described above. The detail is as described before.

Successively, in a step S59, it is determined whether or not a predetermined time has elapsed. Here, the CPU 40 to determine whether or not the count value of the timer 502e has reached 90 seconds. If "YES" in the step S59, that is, if the predetermined time has elapsed, the second game processing is ended as it is to thereby return to the game entire processing. On the other hand, if "NO" in the step S59, that is, if the predetermined time has not elapsed, it is determined whether or not both of the A button 26d and the B trigger switch 26i are turned on in a step S61.

If "NO" in the step S61, the process returns to the step S55 as it is to continue the second game. On the other hand, if "YES" in the step S61, the second game processing is ended to return to the game entire processing. That is, even in the middle of the second game, if both of the A button 26d and the B trigger switch 26i are turned on, a return to the game title (title screen 100) is made.

It should be noted that in this embodiment, in a case that the predetermined time has elapsed or in a case that the predetermined key or the like is operated, the second game is ended, but there is no need of being restricted thereto. For example, in a case that a condition for game clear of the second game is set, if the condition for the game clear is satisfied before a lapse of the predetermined time, the second game may be ended.

Figure 18:
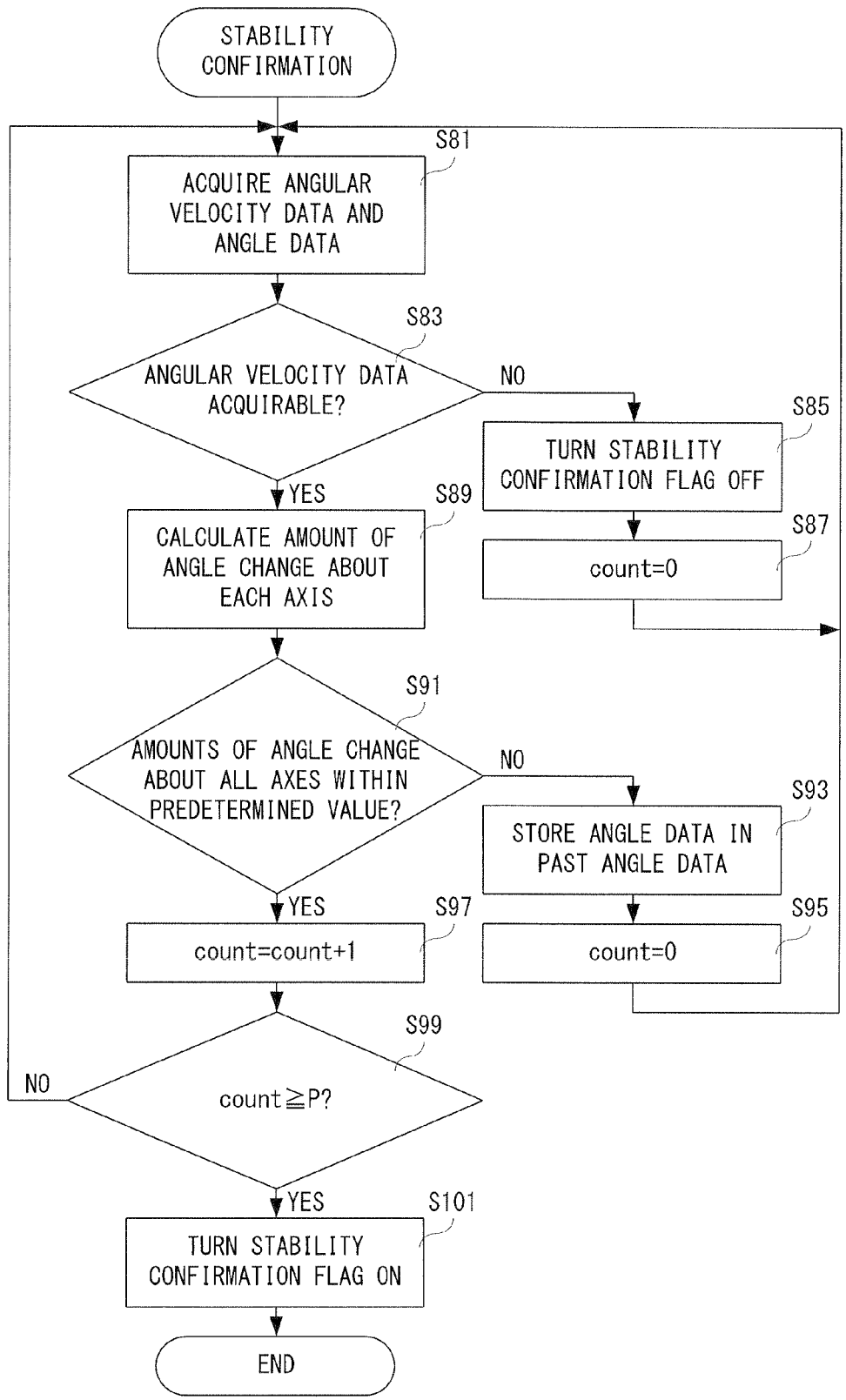
FIG. 18 shows an example non-limiting flowchart showing stability confirmation processing by the CPU shown in FIG. 2.

FIG. 18 is a flowchart showing the stability confirmation processing by the CPU 40. As shown in FIG. 18, when starting the stability confirmation processing, the CPU 40 acquires angular velocity data and angle data in a step S81. Here, the CPU 40 acquires the angle by accumulating the angular velocities corresponding to the angular velocity data. In a succeeding step S83, it is determined whether or not the angular velocity data is acquirable. That is, in the step S81, it is determined whether or not the angular velocity data can be acquired.

If "NO" in the step S83, that is, if the angular velocity data cannot be acquired, the stability confirmation flag 502f is turned off in a step S85, 0 is set to the variable count (count=0)

in a step S87, and the process returns to the step S81. Here, the count is a variable as to the number of times that it is determined that the angle (attitude) of the controller 22 does not change (the controller 22 is at a standstill).

On the other hand, if "YES" in the step S83, that is, if the angular velocity data can be acquired, an amount of angle change about each axis is calculated in a step S89. That is, the CPU 40 calculates an amount of angle change for each axis by subtracting the angle about each of the X axis, Y axis, Z axis indicated by the past angle data 502*d* at the previous frame from the angle about each of the X axis, Y axis, Z axis indicated by the angle data 502*c* at the current frame. That is, the amount of attitude change of the controller 22 is evaluated.

In a next step S91, it is determined whether or not the amounts of angle change about the respective axes are all within a predetermined value. That is, the CPU 40 determines whether or not the controller 22 is at a standstill. If "NO" in the step S91, that is, if the amount of angle change about any one of the axes is above the predetermined value, the stability confirmation flag 502*f* is turned off in a step S93, the variable count is set to 0 in a step S95, and the process returns to the step S81.

On the other hand, if "YES" in the step S91, that is, if the amounts of angle change about the respective axes are all within the predetermined value, the variable count is added by one (count=count+1) in a step S97, and it is determined whether or not the variable count is equal to or more than a threshold value P in a step S99. If "NO" in the step S99, that is, if the variable count is less than the threshold value P, the process returns to the step S81. On the other hand, if "YES" in the step S99, that is, if the variable count is equal to or more than the threshold value P, the stability confirmation flag 502*f* is turned on in a step S101, and the stability confirmation processing is ended.

According to this embodiment, in a case that the title screen is displayed, a stable state is confirmed, and when a state that the controller is left continues for a predetermined time or more thereafter, the second game different from the first game to be played in the main part is started. Thus, after a confirmation of the stable state of the controller with the gyro sensor is awaited, the second game can be played. This makes it possible to give a meaning to waiting. Also, if the player waits so long, he or she can have a fun by playing the second game.

Furthermore, according to this embodiment, while the player puts the controller on a desk, or the like and waits in order to play the second game, the stable state of the controller is confirmed, and therefore, it is possible to naturally perform the stability confirmation processing of the controller necessary for playing the first game. Thus, it is possible to immediately start the first game.

In addition, in this embodiment, the description is made on a case that one controller is used, but a plurality of controllers may be used. In such a case, the stability confirmation processing is executed as to all the controllers, and if the stable state is confirmed as to all the controllers, the stability confirmation flag is turned on. Also, when the first game is selected, if the stable state has been confirmed as to all the controllers, the first game is started as it is. Accordingly, if there is even one controller for which the stable state is not confirmed, the stability confirmation processing is executed as to at least this controller prior to the start of the first game.

Additionally, in this embodiment, the gyro unit is connected to the controller, but the gyro unit may be contained. Or, only the gyro sensor may be contained in the controller.

Furthermore, in this embodiment, in a case that the title screen is displayed, when the predetermined key or the like is operated, the top menu is displayed to select the first game, but the first game may be started immediately without selection of the first game.

In addition, in this embodiment, the angular velocity data is corrected and then stored in the data memory area, but in this stability confirmation processing, whether stability or not is merely determined, and therefore, the angular velocity data need not be corrected. That is, the angular velocity data stored in the buffer provided to the wireless controller module can be used as it is.

Moreover, this embodiment can be applied to a game system in which the game entire processing, the first game processing, the second game processing and the stability confirmation processing are separately processed by a plurality of computers, or the like.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A game apparatus for performing game processing based on at least an angular velocity in response to an operation performed on an operating device equipped with a gyro sensor, comprising:
    an initial screen presentation device configured to generate an initial screen for presentation before a start of a first game;
    a determination device configured to determine whether or not an attitude of said operating device is stable when said initial screen is presented;
    a first game starter configured to start said first game in response to an operation when said initial screen is presented;
    a first game processor configured to perform said first game on the basis of the angular velocity acquired from said operating device;
    a second game starter configured to start a second game different from said first game when a predetermined time has elapsed without performance of said operation after determination that the attitude of said operating device is stable; and
    a second game processor configured to perform said second game on the basis of the angular velocity acquired from said operating device.

2. The game apparatus according to claim 1, wherein said operating device has at least one key, and said first game starter is configured to start said first game in response to an operation of said key.

3. The game apparatus according to claim 1, wherein said second game processor is configured to end said second game after a lapse of a predetermined time from the start of said second game, and said initial screen presentation device is further configured to generate said initial screen for presentation after the end of said second game.

4. The game apparatus according to claim 1, further comprising:
    an instruction presentation device is configured to generate a presentation of resents an instruction for making the attitude of said operating device stable if said determination device determines that the attitude of said operating device is not stable when said first game is started by said first game starter, wherein said first game starter is configured to start said first game after said determination device determines that the attitude of said operating device is stable.

5. A non-transitory storage medium storing a game program for performing game processing based on at least an angular velocity in response to an operation performed on an operating device equipped with a gyro sensor, said game program causes a computer to provide functionality comprising:
- presentation of an initial screen before a start of a first game;
- determination of whether or not an attitude of said operating device is stable when said initial screen is presented;
- start of said first game in response to an operation when said initial screen is presented;
- performance of said first game on the basis of the angular velocity acquired from said operating device;
- start of a second game different from said first game when a predetermined time has elapsed without performance of said operation after said determination that the attitude of said operating device is stable; and
- performance of said second game on the basis of the angular velocity acquired from said operating device.

6. The non-transitory storage medium according to claim 5, wherein
said operating device has at least one key, and
said start of said first game is in response to an operation of said key.

7. The non-transitory storage medium according to claim 5, wherein
said second game is ended after a lapse of a predetermined time from the start of said second game, and
said initial screen is presented after the end of said second game.

8. The non-transitory storage medium according to claim 5, said game program causes said computer to provide further functionality comprising:
presentation of an instruction for making the attitude of said operating device stable if said determination determines that the attitude of said operating device is not stable when said first game is started, wherein
said first game is started after said determination that the attitude of said operating device is stable.

9. A game controlling method of a game apparatus performing game processing based on at least an angular velocity in response to an operation performed on an operating device equipped with a gyro sensor, comprising:
(a) presenting an initial screen before a start of a first game;
(b) determining whether or not an attitude of said operating device is stable when said initial screen is presented;
(c) starting said first game in response to an operation when said initial screen is presented;
(d) performing said first game on the basis of the angular velocity acquired from said operating device;
(e) starting a second game different from said first game when a predetermined time has elapsed without performance of said operation after said step (b) determines that the attitude of said operating device is stable; and
(f) performing said second game on the basis of the angular velocity acquired from said operating device.

10. The game controlling method according to claim 9, wherein
said operating device includes at least one key, and
said step (c) starts said first game in response to an operation of said key.

11. The game controlling method according to claim 9, comprising:
said step (e) ends said second game after a lapse of a predetermined time from the start of said second game, and
said step (a) further presents said initial screen after the end of said second game.

12. The game controlling method according to claim 9, further comprising:
(g) presenting an instruction for making the attitude of said operating device stable if said step (b) determines that the attitude of said operating device is not stable when said first game is started by said step (c), wherein
said step (c) starts said first game after said step (b) determines that the attitude of said operating device is stable.

13. A game system for performing game processing based on at least an angular velocity in response to an operation performed on an operating device equipped with a gyro sensor, comprising:
a computer system, comprising at least one computer processor, the computer system being configured to:
- generate a presentation of an initial screen before a start of a first game;
- determine whether or not an attitude of said operating device is stable when said initial screen is presented;
- start said first game in response to an operation when said initial screen is presented;
- perform said first game on the basis of the angular velocity acquired from said operating device;
- start a second game different from said first game when a predetermined time has elapsed without performance of said operation after determination that the attitude of said operating device is stable; and
- perform said second game on the basis of the angular velocity acquired from said operating device.

14. The game system according to claim 13, wherein
said operating device has at least one key, and
said computer system is further configured to start said first game in response to an operation of said key.

15. The game system according to claim 13, wherein said computer system is further configured to:
end said second game after a lapse of a predetermined time from the start of said second game, and
generate said initial screen for presentation after the end of said second game.

16. The game system according to claim 13, wherein computer system is further configured to:
generation a presentation of an instruction for making the attitude of said operating device stable if determination that the attitude of said operating device is not stable when said first game is started, wherein
said first game after determination that the attitude of said operating device is stable.

* * * * *